(12) United States Patent
Ikeda

(10) Patent No.: US 9,117,034 B2
(45) Date of Patent: Aug. 25, 2015

(54) DATA PROCESSING APPARATUS, COMPUTATION DEVICE, CONTROL METHOD FOR DATA PROCESSING APPARATUS

(71) Applicant: FUJITSU LIMITED, Kawasaki-shi, Kanagawa (JP)

(72) Inventor: Yoshiro Ikeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 13/751,249

(22) Filed: Jan. 28, 2013

(65) Prior Publication Data
US 2013/0262735 A1    Oct. 3, 2013

(30) Foreign Application Priority Data
Mar. 30, 2012    (JP) .................................. 2012-082847

(51) Int. Cl.
| | |
|---|---|
| *G06F 13/40* | (2006.01) |
| *H04L 12/437* | (2006.01) |
| *H04L 12/66* | (2006.01) |
| *H04L 12/54* | (2013.01) |
| *G05B 9/03* | (2006.01) |

(52) U.S. Cl.
CPC .............. *G06F 13/4022* (2013.01); *G05B 9/03* (2013.01); *H04L 12/437* (2013.01); *H04L 12/5692* (2013.01); *H04L 12/66* (2013.01)

(58) Field of Classification Search
CPC .... G05B 9/03; H04L 12/437; H04L 12/5692; H04L 12/66
USPC .................................................. 709/238–239
See application file for complete search history.

(56) References Cited

U.S. PATENT DOCUMENTS

| | | | | |
|---|---|---|---|---|
| 5,305,306 | A | * | 4/1994 | Spinney et al. ............... 370/296 |
| 5,781,528 | A | * | 7/1998 | Sato et al. ..................... 370/218 |
| 2013/0193761 | A1 | * | 8/2013 | Colombi et al. ................ 307/64 |

FOREIGN PATENT DOCUMENTS

JP          11-328134       11/1999

OTHER PUBLICATIONS

Patent Abstracts of Japan, Publication No. 11-328134, Published Nov. 30, 1999.

* cited by examiner

*Primary Examiner* — Chirag R Patel
(74) *Attorney, Agent, or Firm* — Staas & Halsey LLP

(57) ABSTRACT

A data processing apparatus includes a plurality of computation devices connected to each other by a communication path. Each of the computation devices includes: a switching section provided to each of terminals and switchable between an upper layer use state in which communication is performed by a communication section between a given terminal of a plurality of terminals and a corresponding internal path and there is no connection performed by a bypass section between a corresponding pair of the plurality of the terminals, and an upper layer non-use state in which communication is not performed by a communication section between the given terminal of the plurality of the terminals and the corresponding internal path and connection is performed by the bypass section between the corresponding pair of the plurality of the terminals.

14 Claims, 22 Drawing Sheets

FIG.5 58

| COORDINATE VALUE | PORT ID | DEFECT IDENTIFICATION VALUE | COMPUTATION LOAD DESIGNATION VALUE |
|---|---|---|---|
| ⋮ | ⋮ | ⋮ | ⋮ |
| (2, 4) | 2-4-A | 0 | 1 |
| | 2-4-B | 0 | |
| | 2-4-C | 0 | |
| | 2-4-D | 0 | |
| | 2-4-E | 1 | |
| | 2-4-F | 0 | |
| | 2-4-G | 0 | |
| | 2-4-H | 0 | |
| ⋮ | ⋮ | ⋮ | ⋮ |

FIG.21

| SUBLAYER | DATA HANDLED | OUTLINE EXAMPLES OF FUNCTION |
|---|---|---|
| APPLICATION | MEMORY DATA | COMMUNICATION APPLICATIONS API OF COMMUNICATION I/F |
| (OTHER COMMUNICATION SUBLAYER) | TRANSACTION LAYER PACKETS | GENERATION FROM DATA, DATA EXTRACTION FROM RECEIVED PACKETS, etc. |
| DATA LINK LAYER | DATA LINK LAYER PACKETS (FORWARDING ADDRESS, CRC etc.) | PACKET HEADER ANALYSIS, ROUTING, ERROR CHECKING, RETRANSMISSION PROCESSING, FLOW CONTROL, etc. |
| PHYSICAL LAYER | BIT ARRAY | SerDes, PMA, PMD, PCS (ENCODING (8b10b, 64b66b, etc.)) |

DATA PROCESSING APPARATUS, COMPUTATION DEVICE, CONTROL METHOD FOR DATA PROCESSING APPARATUS

CROSS-REFERENCE TO RELATED APPLICATION

This application is based upon and claims the benefit of priority of the prior Japanese Patent Application No. 2012-082847, filed on Mar. 30, 2012, the entire contents of which are incorporated herein by reference.

FIELD

The embodiments discussed herein are related to a data processing apparatus, a computation device, and a data processing apparatus control method.

BACKGROUND

Known connection methods for connecting between plural data processing apparatuses included in a data processing system include indirect connection methods that connect between data processing apparatuses through an external designated router, and direct connection methods that directly connect together respective data processing apparatuses. In a direct connection method, plural data processing apparatuses are each provided with a router section that communicates with the respective data processing apparatuses performing computation, and the plural data processing apparatuses are connected together through a communication network (direct network).

A communication protocol in communication between data processing apparatuses is for example hierarchized as illustrated in FIG. 21.

RELATED PATENT DOCUMENTS

Japanese Laid-Open Patent Publication No. H11-328134

SUMMARY

According to an aspect of the embodiments, a data processing apparatus is provided. The data processing apparatus includes: a plurality of computation devices connected to each other by a communication path; and a control device that controls the plurality of computation devices. Each of the computation devices includes: a plurality of terminals respectively connected to the communication path; a communication section that performs communication with a more upper layer in a communication protocol than a physical layer through an internal path connectable to a given terminal out of the plurality of terminals; a bypass section connectable between a pair of the plurality of the terminals; a switching section provided to each of the terminals and switchable between an upper layer use state in which communication is performed by the communication section between a given terminal of the plurality of the terminals and the corresponding internal path and there is no connection performed by the bypass section between the corresponding pair of the plurality of the terminals, and an upper layer non-use state in which communication is not performed by the communication section between the given terminal of the plurality of the terminals and the corresponding internal path and connection is performed by the bypass section between the corresponding pair of the plurality of the terminals; and a control section that based on control data input from the control device respectively controls to switch the switching section provided to each of the terminals to the upper layer use state or the upper layer non-use state, and the control device outputs the control data to the control section of each of the computation devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a schematic diagram illustrating an example of a configuration of a computation load assignment DB included in a service processor according to an exemplary embodiment;

FIG. 21 is a schematic diagram illustrating an example of sublayers in a communication protocol.

DESCRIPTION OF EMBODIMENTS

Detailed explanation follows regarding an exemplary embodiment of technology disclosed herein, with reference to the drawings. Note that although in the following explanation an example is given of a data processing apparatus that performs parallel computation to perform a single task on plural computation devices, the computation device of the technology disclosed herein is not limited thereto. The technology disclosed herein is, for example, applicable to a portable or desktop personal computer (PC) installed with one or more than one computation device. Moreover, although in the following an example is given of a case in which plural computation devices provided to a system board are connected, the technology disclosed herein is not limited thereto. For example, as illustrated in Table 1, the technology disclosed herein is also applicable to cases in which inter-core connection is performed within a chip (Network On Chip), and to cases in which connection is performed between plural system ports installed to respective computation devices.

Figure 1:
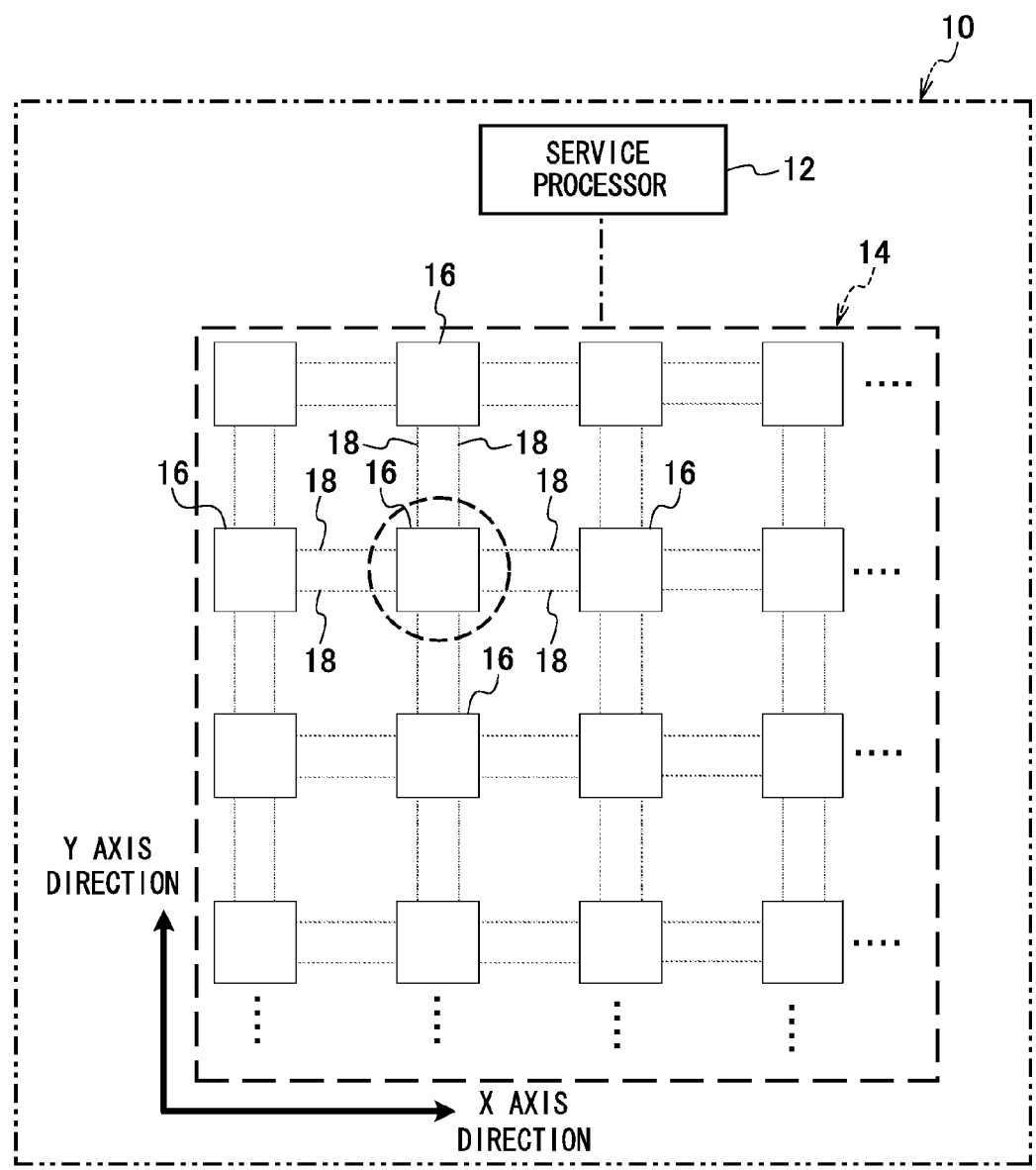
FIG. 1 is a schematic configuration diagram illustrating an example of a configuration of a data processing apparatus according to an exemplary embodiment.

FIG. 1 schematically illustrates an example of a configuration of relevant portions of a data processing system 10 according to the present exemplary embodiment. The data processing system 10 is equipped with a service processor 12 that serves as a control device and a data processing apparatus 14. The service processor 12 controls the data processing system 10 overall. The service processor 12 is for example connected to an external device (for example a Personal Computer (PC)) through the Internet or a Local Area Network (LAN), and executes processing on the data processing apparatus 14 according to requests from the external device. The execution results of processing by the data processing apparatus 14 are then output to the external device. The data processing apparatus 14 is equipped with plural computation devices 16 serving as computation nodes disposed in a matrix formation. Note that in the present exemplary embodiment, explanation follows of an example in which the positions of the computation devices 16 in the data processing apparatus 14 are, as illustrated in the example of FIG. 1, identified employing two-dimensional coordinates with an X axis and a Y axis. In the present exemplary embodiment, as an example of the plural computation devices 16, a system board is provided with 64 computation devices 16 disposed in 8 rows and 8 columns (8 devices in the X axis direction and 8 devices in the Y axis direction). The positions of the computation devices 16 can accordingly be represented by respectively specifying integer values 0 to 7 in the X axis direction and the Y axis direction.

Each of the plural computation devices 16 is connected to adjacent computation devices 16 through communication lines 18, and is enabled for communication with the adjacent computation devices 16 through the communication lines 18. Note that in the present exemplary embodiment, for ease of explanation an example is given of an embodiment in which for example each of the plural computation devices 16 are connected to the adjacent computation devices 16 through two of the communication lines 18, however the technology disclosed herein is not limited thereto. For example, each of the plural computation devices 16 may be connected to each of the adjacent computation devices 16 through 1 or through 3 or more of the communication lines 18.

Figure 2:
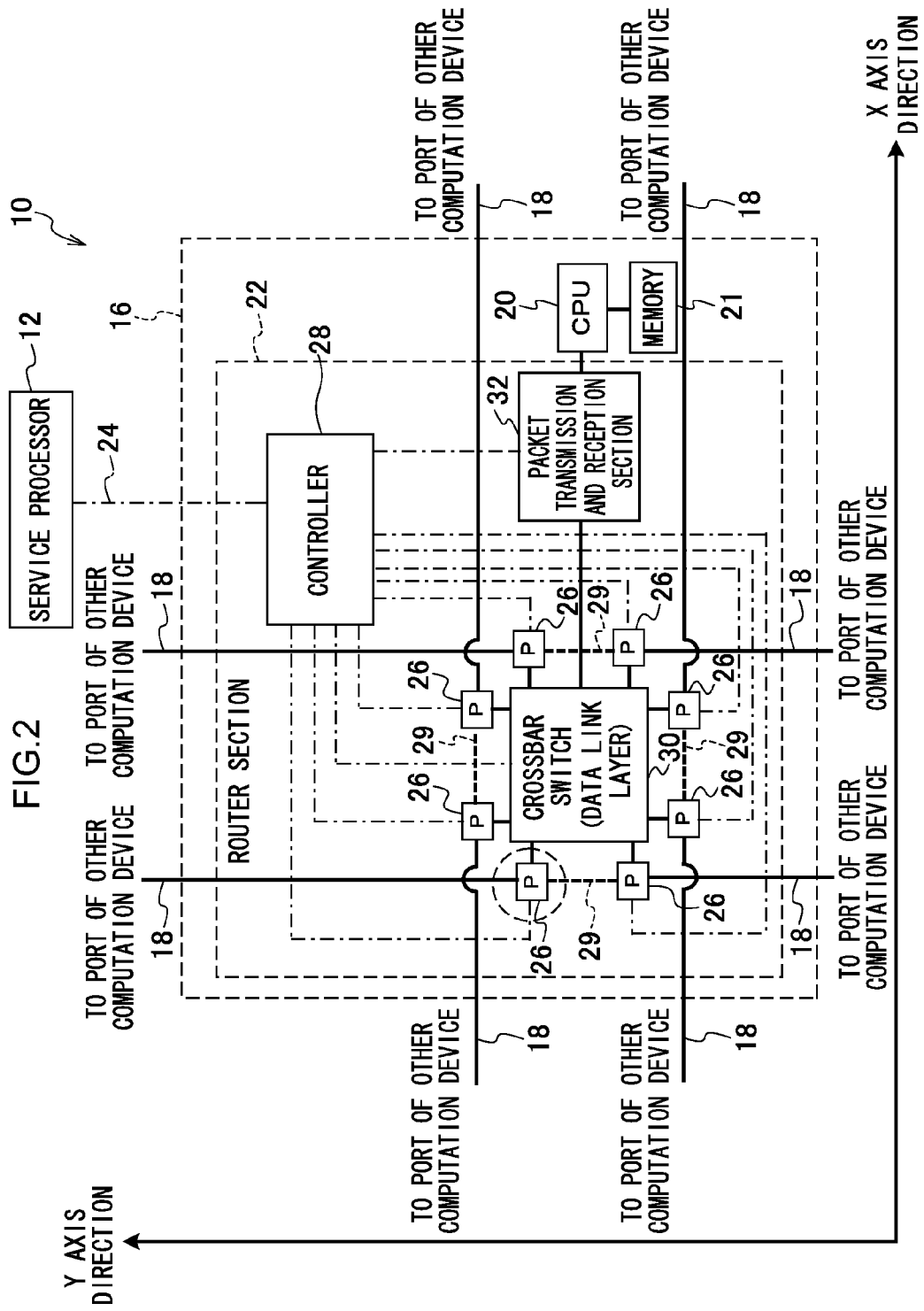
FIG. 2 is a schematic configuration diagram illustrating an example of a configuration of a computation device included in a data processing apparatus according to an exemplary embodiment.

FIG. 2 illustrates an example of a configuration of relevant portions of one of the computation devices 16 that is surrounded by the circular dashed line in FIG. 1. As illustrated in FIG. 2, the computation device 16 is configured including a Central Processing Unit (CPU) 20 serving as a computation processing device that executes processing, a memory 21, and a router section 22 that performs data transmission and reception with the other computation devices 16. In an OSI basic reference model, the CPU 20 performs communication from a transport layer (fourth layer) to an application layer (seventh layer). In an OSI basic reference model, the router section 22 performs communication from a physical layer (first layer) to a network layer (third layer).

The memory 21 is employed by the CPU 20, and includes a RAM region that is a storage medium used for example as a work area during execution of various programs, and a ROM region that is a nonvolatile storage medium that stores various data that needs to be retained even when the power switch is switched off.

The router section 22 is connected communication enabled to the adjacent other computation devices 16 through two of the communication lines 18, and is connected communication enabled to the service processor 12 through a communication line 24. The router section 22 is equipped with plural ports 26, a controller 28, a bypass line 29 serving as an example of a bypass section according to the technology disclosed herein, a crossbar switch 30 serving as an example of a communication section according to the technology disclosed herein, and a packet transmission and reception section 32.

The plural ports 26 are respectively connected to other of the computation devices 16 through the respective communication lines 18 and function as input ports to import data transmitted from the other computation devices 16, and function as output ports to transmit data to the other computation devices 16. In the present exemplary embodiment, as an example of the plural ports 26, there are 8 individual ports 26 provided for each one of the computation devices 16. In the example illustrated in FIG. 2, the 8 individual ports 26 are disposed two each on either side of the crossbar switch 30 at both ends respectively in the X axis direction and the Y axis direction, so as to configure pairs of two individual adjacent ports 26. The bypass lines 29 are respectively connected between the pair-configuring ports 26.

The controller 28 controls the overall operation of the router section 22 under control from the service processor 12.

The controller 28 is connected individually to each of the plural ports 26, to the crossbar switch 30, and to the packet transmission and reception section 32. The controller 28 is accordingly capable of performing monitoring and controlling of the plural respective ports 26, the crossbar switch 30 and the packet transmission and reception section 32.

The crossbar switch 30 includes plural communication lines that are substantially parallel to the X axis, plural communication lines that are substantially parallel to the Y axis, and includes switches provided at each of the intersections between the X axis parallel communication lines and the Y axis parallel communication lines. The transmission destination of data is switched by controlling the operation of these switches. The plural ports 26, the controller 28 and the packet transmission and reception section 32 are connected to the crossbar switch 30 according to the present exemplary embodiment. The plural ports 26, the controller 28 and the packet transmission and reception section 32 are accordingly capable of exchanging data with each other through the crossbar switch 30.

The packet transmission and reception section 32 is connected to the CPU 20, and generates packets for transmission to the crossbar switch 30 under instruction from ports 23. The packet transmission and reception section 32 receives packets that have been transmitted from the other computation devices 16 through one of the ports 26 and the crossbar switch 30, extracts identification data from the received packet, and provides the extracted data to the reception section 32 as requested by the CPU 20.

Figure 3:
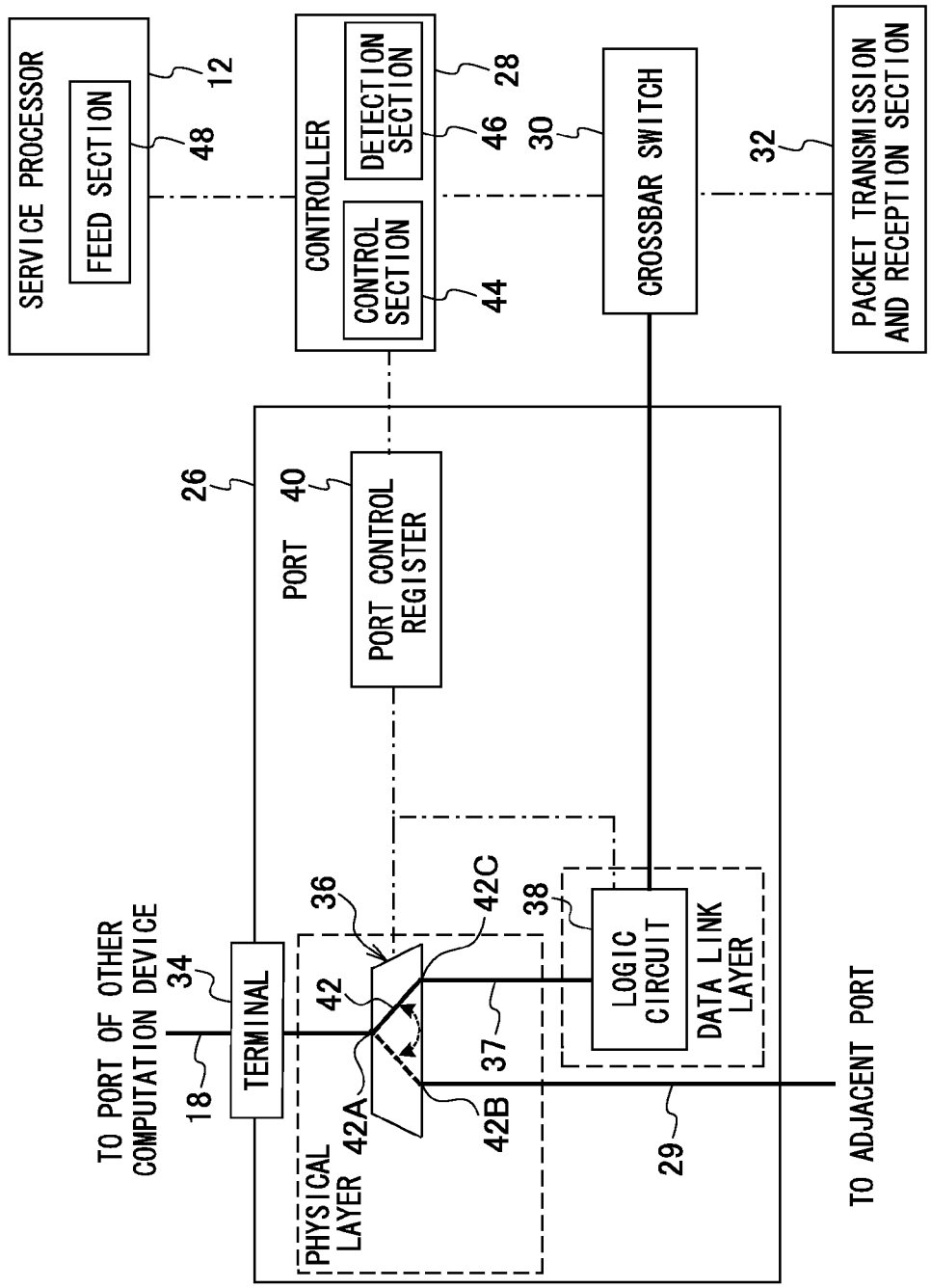
FIG. 3 is a block diagram illustrating an example of relevant functions of a data processing apparatus according to an exemplary embodiment.

FIG. 3 illustrates an example of a configuration of relevant portions of one of the ports 26, depicted surrounded by the circular dashed line in FIG. 2, and illustrates an example of relevant functions of the service processor 12 and the controller 28. As illustrated in FIG. 3, each of the ports 26 includes a terminal 34, a selector 36 serving as an example of a switching section according to the technology disclosed herein, a logic circuit 38 serving as an example of an interface section according to the technology disclosed herein, and a port control register 40. The terminal 34 is connected to the terminal 34 of an adjacent other computation device 16 through a communication line 18.

The selector 36 is provided for each of the terminals 34 and is switchable between an upper layer use state and an upper layer non-use state. Reference here to "upper layer use state" means a state in which for example communication is performed by the logic circuit 38 with the communication line 37 (described later) corresponding to one of the plural terminals 34, but a pair of the plural terminals 34 are not connected together by the corresponding bypass line 29. More specifically it means, for example, a state in which the corresponding terminal 34 and logic circuit 38 are connected, and the corresponding terminal 34 and bypass line 29 are disconnected. Reference here to "upper layer non-use state" means a state in which for example communication is not performed by the logic circuit 38 with the communication line 37 corresponding to one of the plural terminals 34, but a corresponding pair of the plural terminals 34 are connected together by the bypass line 29. More specifically it means, for example, a state in which for example the corresponding terminal 34 and logic circuit 38 are disconnected and the corresponding terminal 34 and bypass line 29 are connected.

The selector 36 is equipped with a single pole double throw switch 42. The common connection point 42A of the single pole double throw switch 42 is connected to the terminal 34. A normally-open a-connection point 42B of the single pole double throw switch 42 is connected to one end of the bypass line 29. Note that the other end of the bypass line 29 is connected to the a-connection point 42B of the single pole double throw switch 42 of the port 26 that configures a pair of ports 26 together with the port 26 illustrated in FIG. 3.

A normally-closed b-connection point 42C of the single pole double throw switch 42 is connected to one end of the communication line 37 that serves as an example of an internal path according to the technology disclosed herein. Note that the other end of the communication line 37 is connected to the logic circuit 38.

The logic circuit 38 is provided corresponding to each of the terminals 34, and transfers data between the corresponding terminal 34 and controller 28, and transfers data between the corresponding terminal 34 and the packet transmission and reception section 32. The processing performed by the logic circuit 38 includes for example receiving a packet transmitted from another computation device 16 through the selector 36, and includes part of processing of a data link layer level, such as header analysis and error checking on the received packet. The packet that has been subjected to the specific processing is then transmitted to the packet transmission and reception section 32 through the crossbar switch 30.

The port control register 40 is connected to the controller 28. The controller 28 is accordingly able to change a value set in the port control register 40. The port control register 40 is also connected to the selector 36, and operation of the single pole double throw switch 42 of the selector 36 is controlled according to the register value set in the port control register 40. For example, the b-connection point 42C of the single pole double throw switch 42 is closed when the set register value of the port control register 40 is "0", and the a-connection point 42B of the single pole double throw switch 42 is closed when the set register value of the port control register 40 is "1". The logic circuit 38 includes a power reception control switch. Power is supplied to the logic circuit 38 when the power reception control switch is switched on, and power supply to the logic circuit 38 is halted when the power reception control switch is switched off. The power reception control switch ON/OFF switching is controlled according to the set register value in the port control register 40. For example the power reception control switch is switched on when the set register value in the port control register 40 is "0", and the power reception control switch is switched off when the set register value in the port control register 40 is "1".

The controller 28 is equipped with a control section 44 and a detection section 46. The control section 44, based on control data according to the technology disclosed herein (for example upper layer use instruction data and upper layer non-use instruction data, described later) input from the service processor 12, controls the selector 36 provided to each of the respective terminals 34 to either an upper layer use state or an upper layer non-use state. For example, control of the selector 36 is performed such that the pair of selectors 36 corresponding to a given pair of terminals 34 are switched to the upper layer non-use state when the terminal 34 (the pair of terminals 34) contained in a given pair of ports 26 are connected at the physical layer level. More specifically, when for example upper layer non-use instruction data is supplied instructing a pair of the terminals 34 to be connected at the physical layer level, control is performed such that the pair of selectors 36 corresponding to the given pair of terminals 34 instructed by the upper layer non-use instruction data switch to the upper layer non-use state. As an example of configuration to control the selector 36 in such a case, the selector 36 is controlled by setting the register value in the port control register 40 to "1" in the present exemplary embodiment.

Moreover, the control section 44 also controls the selector 36 such that the pair of selectors 36 corresponding to the given pair of terminals 34 switch to the upper layer use state when the given pair of terminals 34 are respectively connected to the controller 28. For example, when upper layer use instruction data is supplied instructing the pair of terminals 34 to be connected to the respective logic circuits 38, control is performed such that the pair of selectors 36 corresponding to the pair of terminals 34 switch to the upper layer use state instructed by the upper layer use instruction data. As an example of a configuration for controlling the selector 36 in such a case, in the present exemplary embodiment, the selector 36 is controlled by setting the set register value in the port control register 40 to "0".

The detection section 46 detects for defects in at least one of the circuit elements employed to connect the data link layer that contains the crossbar switch 30 and the logic circuit 38. Note that in the present exemplary embodiment, detection is performed for defects in the crossbar switch 30 or the logic circuit 38, or in both.

When a defect is detected by the detection section 46 in the crossbar switch 30 or the logic circuit 38, or in both, the control section 44 connects at the physical layer level between the terminal 34 of the port 26 in which a defect has been detected and the terminal 34 that forms a pair with this terminal 34.

Moreover, when a defect is detected by the detection section 46 in the crossbar switch 30 or the logic circuit 38, or in both, the control section 44 controls to suppress power consumption of the element detected to be defective. For example, the set register value in the port control register 40 is set to "1" when a defect is detected in the logic circuit 38.

The service processor 12 is equipped with a feed section 48. The feed section 48 outputs control data according to the technology disclosed herein to the control section 44 of each of the computation devices 16. For example, the feed section 48 selectively feeds either the upper layer non-use instruction data or the upper layer use instruction data to the control section 44 of each of the plural respective computation devices 16. In such cases, the upper layer use instruction data includes first identification data according to the technology disclosed herein that indicates at least one terminal of the pair of terminals 34 to be connected at the physical layer level. Moreover, the upper layer use instruction data includes second identification data according to the technology disclosed herein that indicates at least one terminal of the pair of terminals 34 is to be connected to the logic circuit 38.

When the upper layer non-use instruction data is supplied by the feed section 48, the control section 44 controls such that the pair of selectors 36 corresponding to a given pair of terminals 34 identified according to the first identification data contained in the upper layer non-use instruction data switch to the upper layer non-use state. Moreover, when the upper layer use instruction data is supplied by the feed section 48, the control section 44 controls such that the pair of selectors 36 corresponding to a given pair of terminals 34 identified according to the second identification data contained in the upper layer use instruction data switch to the upper layer use state.

Figure 4:
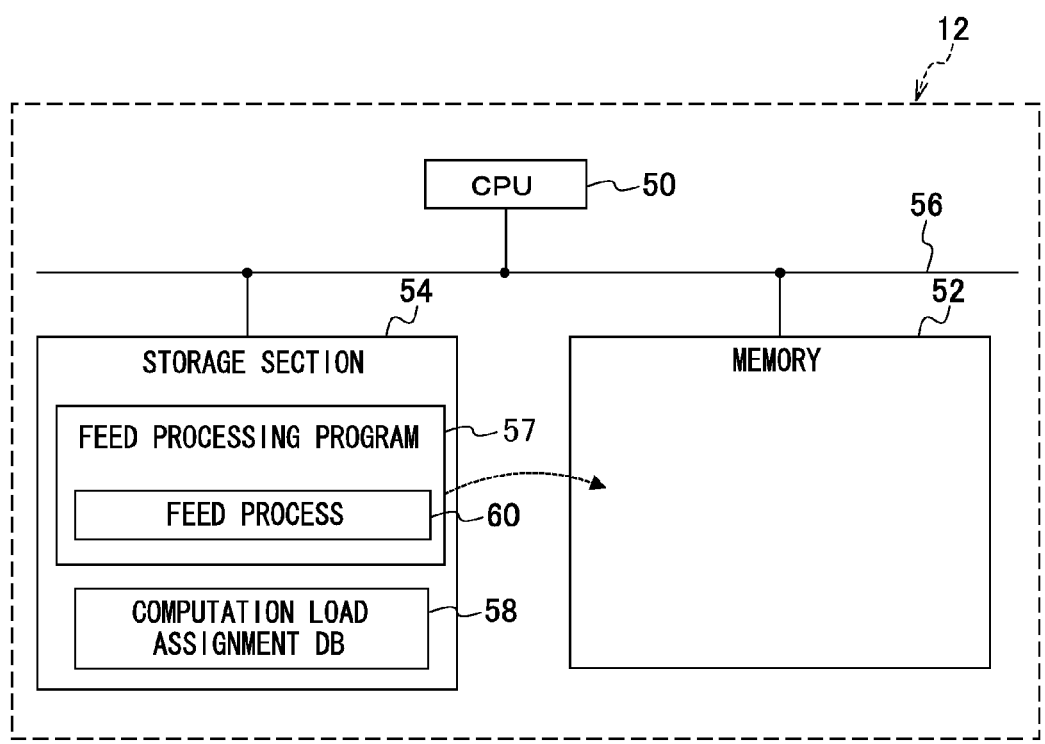
FIG. 4 is a block diagram illustrating an example of a configuration of an electrical system of a service processor according to an exemplary embodiment.

FIG. 4 illustrates an example of a configuration of relevant portions of an electrical system of the service processor 12. As illustrated in FIG. 4, the service processor 12 is equipped with a CPU 50, a memory 52, and a nonvolatile storage section 54, with these connected to each other through a bus 56 configured including for example an address bus and a system bus. Note that the storage section 54 may be implemented for example by a Hard Disk Drive (HDD) or flash memory. The storage section 54 serving as a storage medium is stored with a feed processing program 57 and a computation load assignment database (DB) 58 (described later).

The CPU 50 reads the feed processing program 57 from the storage section 54, expands the feed processing program 57 into the memory 52, and sequentially executes processes of the feed processing program 57. The feed processing program 57 includes a feed process 60. The CPU 50 operates as the feed section 48 illustrated in FIG. 3 by executing the feed process 60.

Note that although in the example illustrated here the feed processing program 57 is read from the storage section 54, the feed processing program 57 does not always need to be stored on the storage section 54 initially. For example, the feed processing program 57 may be stored by preparing a given "portable physical medium", such as a flexible disk (FD), a CD-ROM, a DVD, a magnet-optical disk or an IC Card, for use connected to the service processor 12. The service processor 12 may then acquire the feed processing program 57 from the portable physical medium and execute the feed processing program 57. The feed processing program 57 may also be stored on another computer or server device connected to the service processor 12 through for example the Internet or a LAN, with the service processor 12 acquiring the feed processing program 57 therefrom and executing the feed processing program 57.

FIG. 5 illustrates an example of a configuration of the computation load assignment DB 58. As illustrated in FIG. 5, the computation load assignment DB 58 is a DB employed to identify the computation devices 16 in the data processing apparatus 14 to perform computation (to be loaded), to identify ports 26 detected to be defective by the detection section 46, and to identify ports 26 not detected to be defective by the detection section 46. The computation load assignment DB 58 is registered with coordinate values for identifying all of the respective computation devices 16 contained in the data processing apparatus 14. The computation load assignment DB 58 is also set with computation load designation values for each of the coordinate values, indicating whether or not the particular computation device 16 identified by the corresponding coordinate value is designated to perform processing. In the present exemplary embodiment, "1" is used as an example of the computation load designation value to indicate that the corresponding computation device 16 is designated to perform computation, and "0" is used as an example of the computation load designation value to indicate that the corresponding computation device 16 is not designated to perform computation.

The computation load assignment DB 58 is set with port IDs for each of the coordinate values, to identify the ports 26 of the computation devices 16 identified by the corresponding coordinate value. The computation load assignment DB 58 is also set with defect identification values for each of the port IDs, for identifying whether or not there is a defect in the port 26 identified by the corresponding port ID. In present exemplary embodiment, "1" is used as an example of the defect identification value to identify that the port 26 has a defect, and "0" is used as an example of a defect identification value to identify that the port 26 does not have a defect.

Note that the computation load assignment DB 58 is prepared prior to performing computation with the data processing apparatus 14, and the contents of the computation load assignment DB 58 differ depending on such factors as the volume of data for processing and the time for processing. For example, contents for processing capable of being performed in time with a single computation device 16 has a single individual coordinate value assigned to "1" as the computation load designation value of the computation load assignment DB 58. However in contrast, content of processing desirably performed using all of the computation devices 16 has "1" assigned as the computation load designation value in the computation load assignment DB 58 for the maximum of 64 individual coordinate values.

In the present exemplary embodiment, based on the detection result by the detection section 46 on all the computation devices 16, when it is determined that it is not actually possible to use the computation device(s) 16 initially determined for use, there is the possibility to modify the content of the computation load assignment DB 58. For example, when defects are detected in all of the ports 26 of a single computation device 16 initially determined for use, the computation load designation value assigned to this computation device 16 is changed to "0". Then, when there are computation device(s) 16 present that have at least one pair of ports 26 in which no defect is detected and that currently have "0" set as the computation load designation value, the computation load designation value for one of these computation devices 16 is changed to "1". Note that the computation load designation values may be changed to "1" by prioritizing from any of the computation devices 16 with all ports 26 not detected as being defective.

Figure 6:
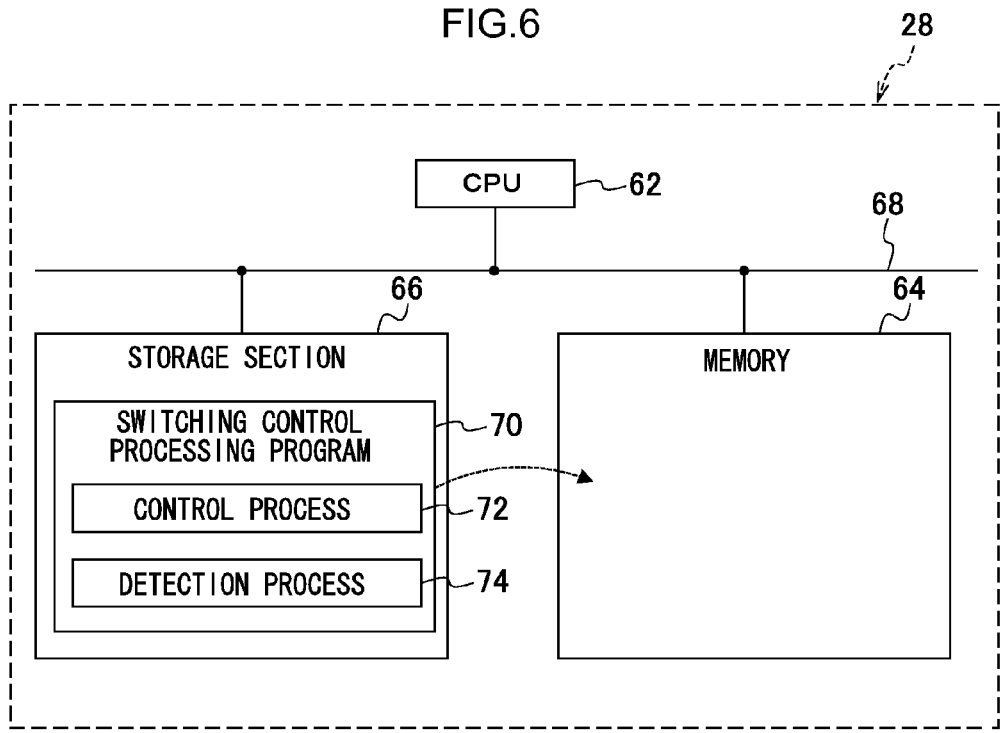
FIG. 6 is a block diagram illustrating an example of a configuration of an electrical system of a controller according to an exemplary embodiment.

FIG. 6 illustrates an example of a configuration of relevant portions of an electrical system of the controller 28. As illustrated in FIG. 6, the controller 28 is equipped with a CPU 62, a memory 64, and a nonvolatile storage section 66, and these are mutually connected together through a bus 68 configured including for example an address bus and a system bus. Note that the storage section 66 may be implemented for example by an HDD or flash memory. The storage section 66 serving as a storage medium is stored with a switching control processing program 70.

The CPU 62 reads the switching control processing program 70 from the storage section 66, expands the switching control processing program 70 in the memory 64, and sequentially executes the processes of the switching control processing program 70. The switching control processing program 70 includes a control process 72 and a detection process 74. The CPU 62 operates as the control section 44 illustrated in FIG. 3 by executing the control process 72. The CPU 62 operates as the detection section 46 illustrated in FIG. 3 by executing the detection process 74.

Note that although in the example illustrated here the switching control processing program 70 is read from the storage section 66, the switching control processing program 70 does not always need to be stored on the storage section 66 initially. For example, the switching control processing program 70 may be stored by first preparing a given "portable physical medium", such as a flexible disk (FD), a CD-ROM, a DVD, a magnet-optical disk or an IC Card, for use connected to the controller 28. The controller 28 may then acquire the switching control processing program 70 from the portable physical medium and execute the switching control processing program 70. The switching control processing program 70 may also be stored on another computer or server device connected to the controller 28 through for example the Internet or a LAN, the controller 28 acquiring the switching control processing program 70 therefrom, and executing the switching control processing program 70.

Figure 7:
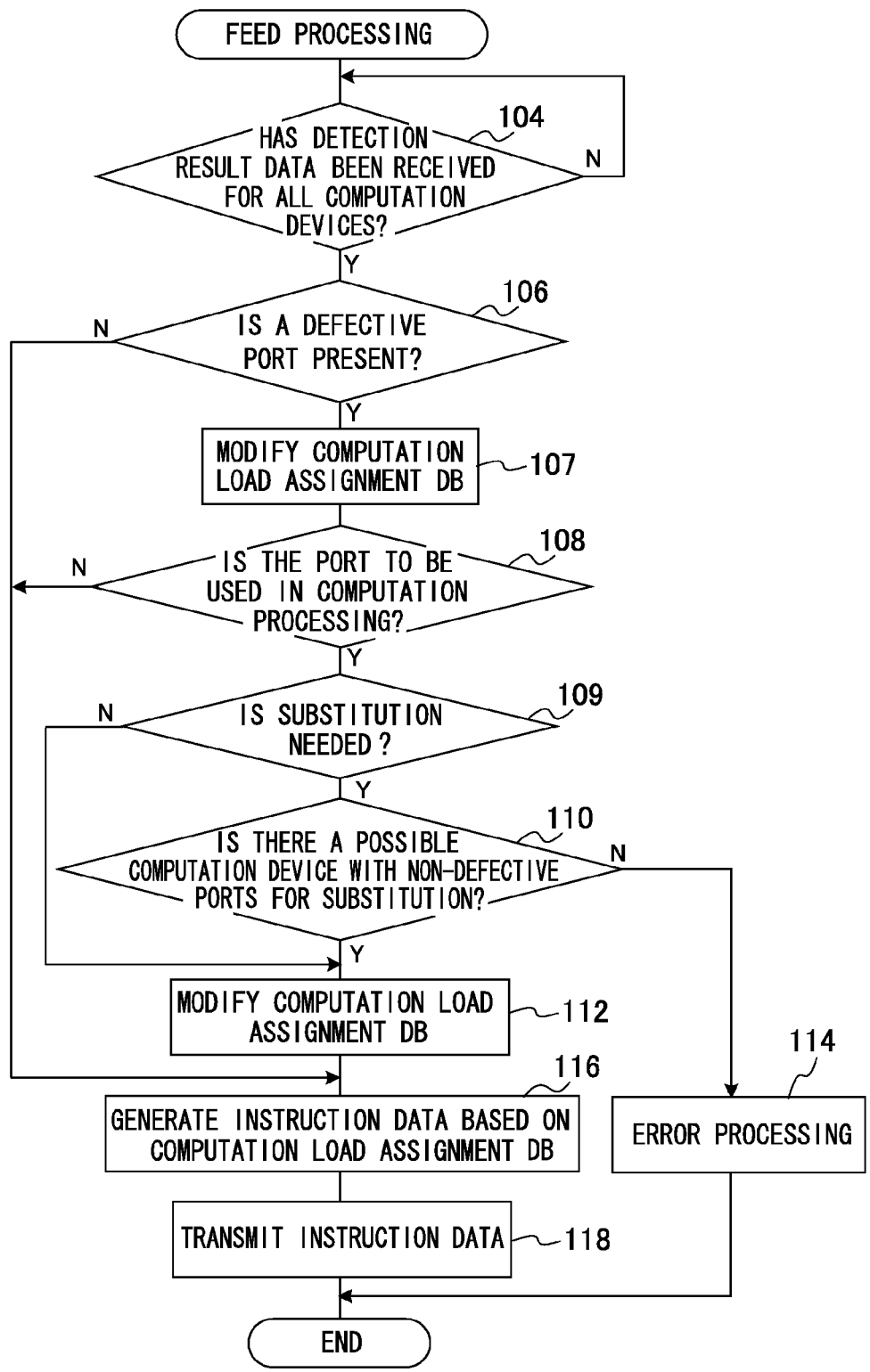
FIG. 7 is a flowchart illustrating an example of a flow of feed processing according to an exemplary embodiment.

Next, as operation of the present exemplary embodiment, explanation follows regarding feed processing performed by the service processor 12 by the CPU 50 executing the feed processing program 57, with reference to FIG. 7. FIG. 7 illustrates feed processing performed when power is introduced to the data processing system 10.

At step 104, determination is made as to whether or not detection result data transmitted at step 164, described later, from all the computation devices 16 has been received by the feed section 48. Reference here to "detection result data" means for example data corresponding to the detection results of the detection section 46 for the computation devices 16. Namely, this is data indicating the presence or absence of a defect in the respective port 26 identified by each port ID. Note that for ease of understanding an example is given of presence or absence of defects in the ports 26, however application may be made to presence or absence of defects at any locations in the computation devices 16, such as defects in the CPU 20 or in the packet transmission and reception section 32. Determination at step 104 is affirmative when detection result data from all the computation devices 16 has been received and processing proceeds to step 106. Determination at step 104 is negative when the detection result data from all the computation devices 16 has not been received, and determination of step 104 is performed again. When the detection result data has been acquired by the feed section 48, the connection mode is determined as for example a mesh network, a hypercube network, or a mesh torus network, described later. The feed section 48 then assigns jobs to each of the computation devices 16 (sets the computation load designation values of the computation load assignment DB 58) in the optimum pattern for the determined connection mode and to also avoid using any elements such as the computation devices 16 and the ports 26 that are incapable due to defects.

At step 106, based on the detection result data received at step 104 the feed section 48 then determines whether or not there are any defective ports 26 present. Determination at step 106 is positive when there are defective port(s) 26 present and processing proceeds to step 107. Determination at step 106 is negative when there are no defective ports 26 present and processing proceeds to step 116.

At step 107, the feed section 48 modifies the computation load assignment DB 58 according to the detection result data received at step 104. For example, when "0" is currently assigned as the defect identification value for the corresponding port ID in the computation load assignment DB 58 even though the port 26 identified by the corresponding port ID contained in the detection result data is identified as actually being defective, the defect identification value is changed to "1". Moreover, when "1" is currently assigned as the defect identification value for the corresponding port ID of the computation load assignment DB 58 even though the port 26 identified by the port ID contained in the detection result data is identified as not actually being defective, the defect value is changed to "0".

At the next step 108, based on the computation load assignment DB 58 acquired at step 100, the feed section 48 determines whether or not the defective port 26 is one of the ports 26 to be used in the computation processing. Determination at step 108 is affirmative when the defective port 26 is one of the ports 26 to be used in the computation processing and processing proceeds to step 109. Determination at step 108 is negative when the defective port 26 is not one of the ports 26 to be used in the computation processing and processing proceeds to step 116.

At step 109, based on the computation load assignment DB 58 modified at step 107, the feed section 48 determines whether or not there is a computation device 16 present that needs to be substituted for computation processing. Namely, determination is made as to whether or not there is a computation device 16 present with all of its ports 26 defective. Determination at step 109 is negative when there is no computation device 16 present that needs to be substituted in computation processing and processing proceeds to step 116. Determination at step 109 is affirmative when there is a computation device 16 that needs to be substituted in computation processing and processing proceeds to step 110.

At step 110, based on the computation load assignment DB 58 modified at step 107, determination is made as to whether or not there is a computation device 16 present having at least a pair of ports 26 that are not defective and possible for substitution. Determination at step 110 is affirmative when there is a substitutable computation device 16 present and processing proceeds to step 112. Determination at step 110 is negative when there is not a substitutable computation device 16 present and processing proceeds to step 114. At step 114, the feed section 48 performs error processing and then ends the feed processing. An example of such "error processing" is processing to notify a user through a notification support device (for example a display connected to the service processor 12) that it is difficult to perform computation processing (for example by an alert).

At step 112, the feed section 48 re-modifies the computation load assignment DB 58 previously modified at step 107. Namely, out of the computation load designation values contained in the computation load assignment DB 58, the feed section 48 changes the computation load designation value corresponding to a computation device 16 identified as a substitutable computation device 16 according to a predetermined rule to "1". The computation load designation value of the computation devices 16 that has been substituted out is changed to "0".

At step 116, the feed section 48 generates upper layer non-use instruction data and upper layer use instruction data (referred to below as "instruction data" where there is no need to discriminate) based on the computation load assignment DB 58 acquired at the current point in time. Namely, upper layer non-use instruction data is generated containing the coordinate values set with "1" as the computation load designation value, and the port IDs assigned with these coordinate values and having "1" assigned as the defect identification value and the port IDs that configure pairs with these port IDs. Moreover, upper layer use instruction data is also generated containing the coordinate values set with "1" as the computation load designation value, and port IDs assigned to these coordinate values containing the port IDs assigned with a defect identification value of "0" and not contained in the upper layer non-use instruction data. Note that reference to "port IDs that configure pairs with these port IDs" means the port IDs identifying each of the ports 26 that configure a pair with the port ID identified ports 26. The port IDs contained here in the upper layer non-use instruction data are examples of the first identification data according to the technology disclosed herein, and the port IDs contained here in the upper layer use instruction data are examples of the second identification data according to the technology disclosed herein.

At the next step 118, the feed section 48 transmits the instruction data generated at step 116 to the computation devices 16 identified by the coordinate values contained in the instruction data generated at step 116. The CPU 62 ends the feed processing after performing the processing of step 118.

Figure 8:
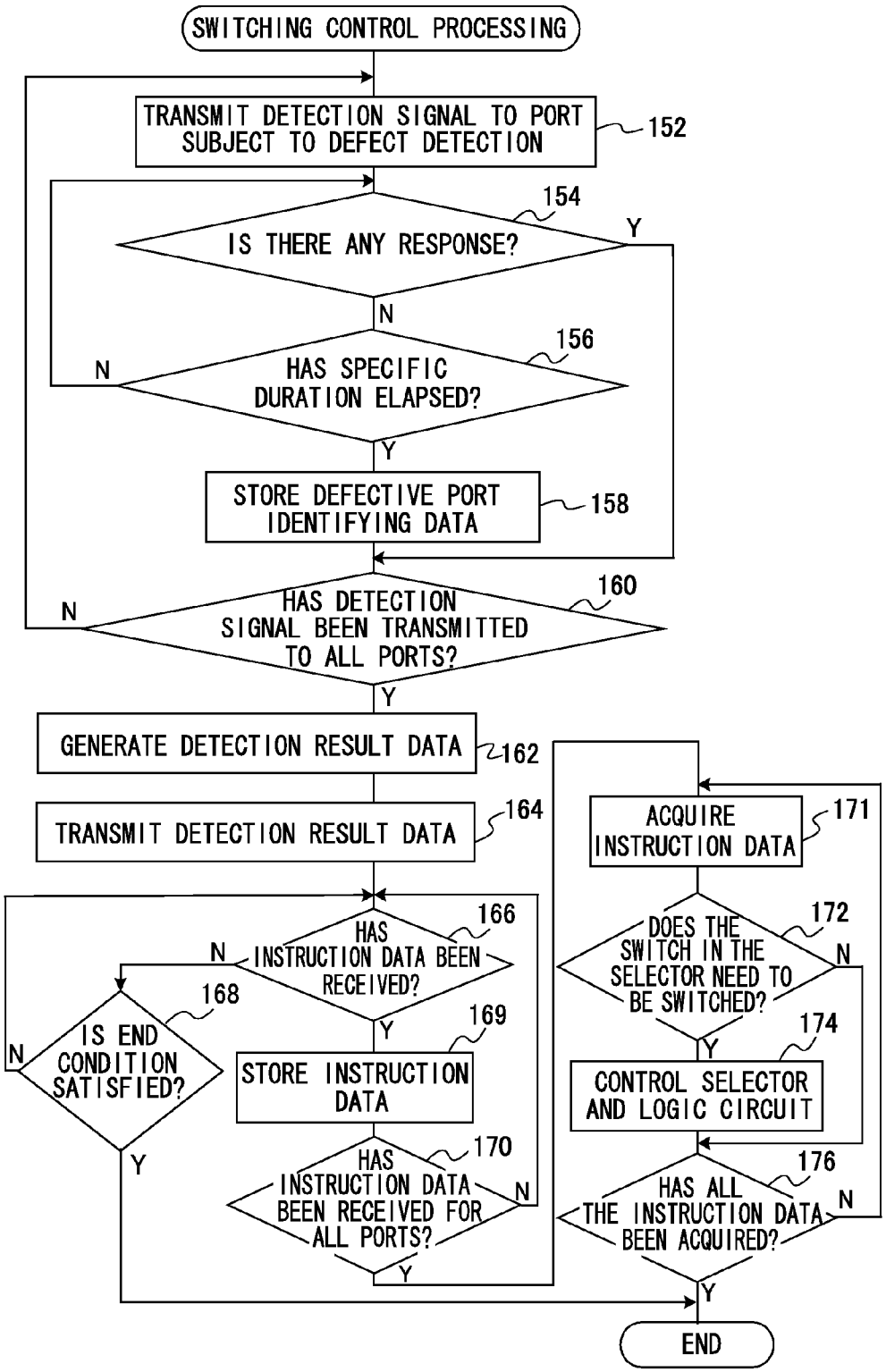
FIG. 8 is a flowchart illustrating an example of a flow of switching control processing according to an exemplary embodiment.

Explanation follows regarding switching control processing performed with the controller 28 by the CPU 62 executing the switching control processing program 70, with reference to FIG. 8. Note that in the following explanation the upper layer non-use instruction data and the upper layer use instruction data are referred to as "instruction data" when there is no need to discriminate therebetween.

In the switching control processing illustrated in FIG. 8, first at step 152 a detection signal is transmitted by the detection section 46 to a transmission destination of one of the ports 26 for defect detection to which a detection signal has not yet been transmitted at step 152 in the current round of switching control processing. Note that all the ports 26 contained in the router section 22 are used as an example of "ports 26 for defect detection". The detection section 46 therefore transmits a detection signal individually to each of the transmission destinations of the logical circuits 38 for all of the ports 26. On receipt of the detection signal, any of the logical circuits 38 that is not defective then transmits a response signal indicating being non-defective to the detection section 46 through the crossbar switch 30. In such cases the detection section 46 is able to receive the response signal as long as the path from the controller 28 to the logic circuit 38 is not defective. However, a defective logic circuit 38 is not able to receive the detection signal, or is not able to transmit the response signal to the detection section 46 through the crossbar switch 30 even though the detection signal was received. The detection section 46 is accordingly not able to receive the response signal. Moreover, when the path from the controller 28 to the logic circuit 38 is defective, a situation occurs in which the detection signal is not delivered to the logic circuit 38 or a situation occurs in which the response signal is not delivered to the controller 28. The detection section 46 is also not able to receive the expected response signal in such cases.

Therefore, at the next step 154, the detection section 46 determines whether or not the response signal has been received as expected from the logic circuit 38 at the transmission destination of the detection signal (whether or not there was the expected response). Determination at step 154 is affirmative when the expected response signal has been received, and processing proceeds to step 160. However determination at step 154 is negative when the expected response signal has not been received, and processing proceeds to step 156. At step 156, the detection section 46 determines whether or not a specific duration (for example 0.01 seconds) has elapsed from the end of step 152. Determination at step 156 is negative when the specific duration has not yet elapsed, and processing returns to step 154. Determination at step 156 is affirmative when the specific duration has elapsed, and processing proceeds to step 158. At step 158, the detection section 46 stores in the memory 64 the port ID identifying the port 26 to which the step 152 detection signal transmission destination logic circuit 38 belongs.

At the next step 160, the detection section 46 determines whether or not the detection signal has been transmitted to all of the ports 26 for defect detection. When at step 160 detection signals have not yet been transmitted to all the ports 26, processing returns to step 152. However when at step 160 the detection signals have been transmitted to all of the ports 26, processing proceeds to step 162.

At step 162, the detection section 46 generates detection result data when port IDs are stored in the memory 64, and then erases the port IDs from the memory 64. Namely, when port IDs are stored in the memory 64 for all the ports 26, detection result data is generated to indicate that the ports 26 identified by their port IDs stored in the memory 64 are defective, and then the port IDs are erased from the memory 64. However when there are no port IDs stored in the memory 64, detection result data is generated indicating that the ports 26 identified by the port IDs for all the ports 26 are not defective. When port IDs of some of the ports 26 are stored in the memory 64, detection result data is generated indicating that the ports 26 identified by the port IDs stored in the memory 64 are defective, and indicating that the other ports 26 are not defective. The port IDs in the memory 64 are also erased in such cases.

At the next step 164, the detection section 46 transmits the detection result data generated at step 162 to the service processor 12. The detection result data transmitted at step 164 is received at previously described step 104.

At the next step 166, the control section 44 determines whether or not the instruction data transmitted at step 118 has been received. Determination at step 166 is negative when the instruction data has not yet been received and processing proceeds to step 168. At step 168, the control section 44 determines whether or not a switching control processing end condition is satisfied (for example a condition that a specific duration (for example 0.1 seconds) has elapsed from when step 164 ended). Determination at step 168 is affirmative when the end condition is satisfied and the switching control processing is ended. Determination at step 168 is negative when the end condition is not satisfied and processing returns to step 166.

Determination at step 166 is affirmative when the instruction data has been received and processing proceeds to step 169. At step 169 the control section 44 stores in the memory 64 the instruction data received at step 166. At the next step 170, the control section 44 determines whether or not the instruction data has been received for all of the ports 26 at step 166. Determination at step 170 is negative when the instruction data has not yet been received for all of the ports 26 and processing returns to step 166. Determination at step 170 is affirmative when the instruction data has been received for all of the ports 26, and processing proceeds to step 171.

At step 171 the control section 44 acquires one item of instruction data from the memory 64. At the next step 172, the control section 44 determines whether or not the connection destination of the single pole double throw switch 42 in the selector 36 contained in the port 26 identified by the instruction data acquired at step 171 needs to be switched. Determination at step 172 is negative when there is no need to switch the connection destination of the single pole double throw switch 42, and processing proceeds to step 176. Determination at step 172 is affirmative when there is a need to switch the connection destination of the single pole double throw switch 42, and processing proceeds to step 174.

At step 174, according to the instruction data stored in the memory 64, the control section 44 controls the selector 36 requiring the connection destination of the single pole double throw switch 42 to be switched, and controls power supply to the logic circuit 38 corresponding to the selector 36 needing switching. For example, when the instruction data acquired at step 171 is upper layer non-use instruction data, the selector 36 and the logic circuit 38 of each of the respective pairs of ports 26 identified by the port ID contained in the upper layer non-use instruction data are subject to control. In such cases, the control section 44 sets to "1" the set register value in the port control register 40 included in the respective pairs of ports 26 identified by the port IDs contained in the upper layer non-use instruction data. The connection destination of the respective single pole double throw switch 42 in the selector 36 of each of the respective pairs of ports 26 identified by the port IDs contained in the upper layer non-use instruction data acquired at step 171 is accordingly switched to the a-connection point 42B. The power reception control switch of the logic circuit 38 of each of the respective pairs of ports 26 identified by the port IDs contained in the upper layer non-use instruction data acquired at step 171 is thereby switched off. Power supply is thereby halted to the logic circuit 38 of each of the respective pairs of ports 26 identified by the port IDs contained in the upper layer non-use instruction data acquired at step 171.

Figure 9:
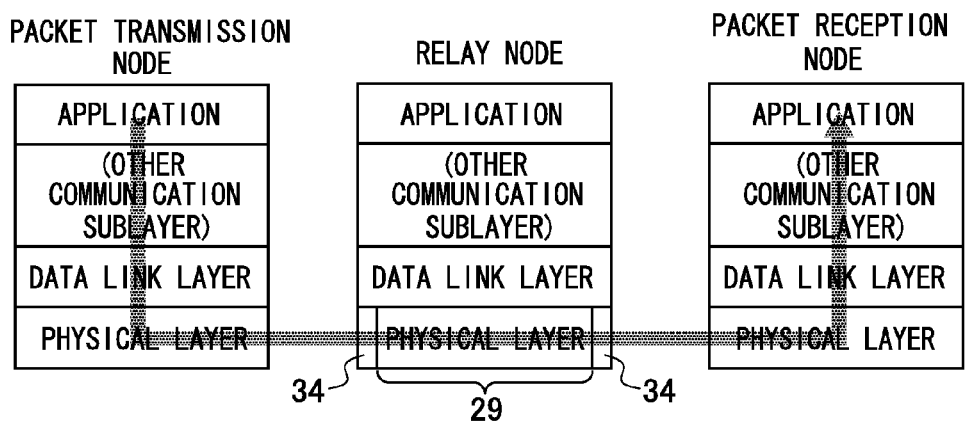
FIG. 9 is a schematic diagram illustrating an example of operation and advantageous effects that can be obtained by performing switching control processing according to an exemplary embodiment.

Thus when the connection destination of the single pole double throw switch 42 contained in the selectors 36 in the respective pair of ports 26 is switched to the a-connection point 42B, the respective terminals 34 of the pair of ports 26 are made electrically continuous with each other through the bypass line 29. In such cases the data processing system 10 according to the present exemplary embodiment is capable of making the computation devices 16 including the control section 44 perform the step 172 and function as a relay node as illustrated in FIG. 9, for example. Namely, it becomes possible to pass a packet transmitted from another computation device 16 acting as a packet transmission node through the pair of terminals 34 and the bypass line 29 and receive the packet with another computation device 16 acting as a packet transmission node. In such cases, the processing of the data link layer and the upper layer level is not performed in the relay node. The time for the packet to pass through the relay node is accordingly shortened.

However, when the instruction data acquired at step 171 is the upper layer use instruction data, the selector 36 and the logic circuit 38 of the respective pairs of ports 26 identified by the port IDs contained in the upper layer use instruction data are subject to control. In such cases, the control section 44 sets to "0" the value of the setting register of the port control registers 40 included in the respective pairs of ports 26 identified by the port IDs contained in the upper layer use instruction data. The connection destination of the single pole double throw switch 42 of the selector 36 included in the pairs of respective ports 26 identified by the port ID contained in the upper layer use instruction data acquired at step 171 is thereby switched to the b-connection point 42C. Moreover, the power reception control switch of the logic circuit 38 included in the pairs of respective ports 26 identified by the port IDs contained in the upper layer use instruction data acquired at step 171 is switched on. Power supply accordingly starts to the logic circuit 38 included in the pairs of respective ports 26 identified by the port ID contained in the upper layer use instruction data acquired at step 171.

At the next step 176 determination is made as to whether or not step 171 has been performed for all the items of instruction data stored in the memory 64 at step 169. At step 176, processing returns to step 171 when step 171 has not yet been performed for all the instruction data items stored in the memory 64. At step 176, when step 171 has already been performed for all the instruction data stored in the memory 64, the instruction data is erased from the memory 64, determination is affirmative, and the switching control processing is ended.

Note that in step 166 to step 176, for convenience explanation has been given of an example of an embodiment in which the instruction data for all the ports 26 is confirmed, however it does not always need to confirm instruction data for all of the respective ports 26. Since the manner in which the settings of whichever of the ports 26 are to be changed is instructed by the service processor 12, it is sufficient just to operate the controller 28 according to the instructions of the service processor 12 in each of the router sections 22. Namely, configuration may be made such that the control section 44 receives a new physical layer bypass setting (difference to the previous) from the service processor 12, and switching of the single pole double throw switch 42 inside the selector 36 is changed to the setting for the ports 26 that needs switching.

Figure 10:
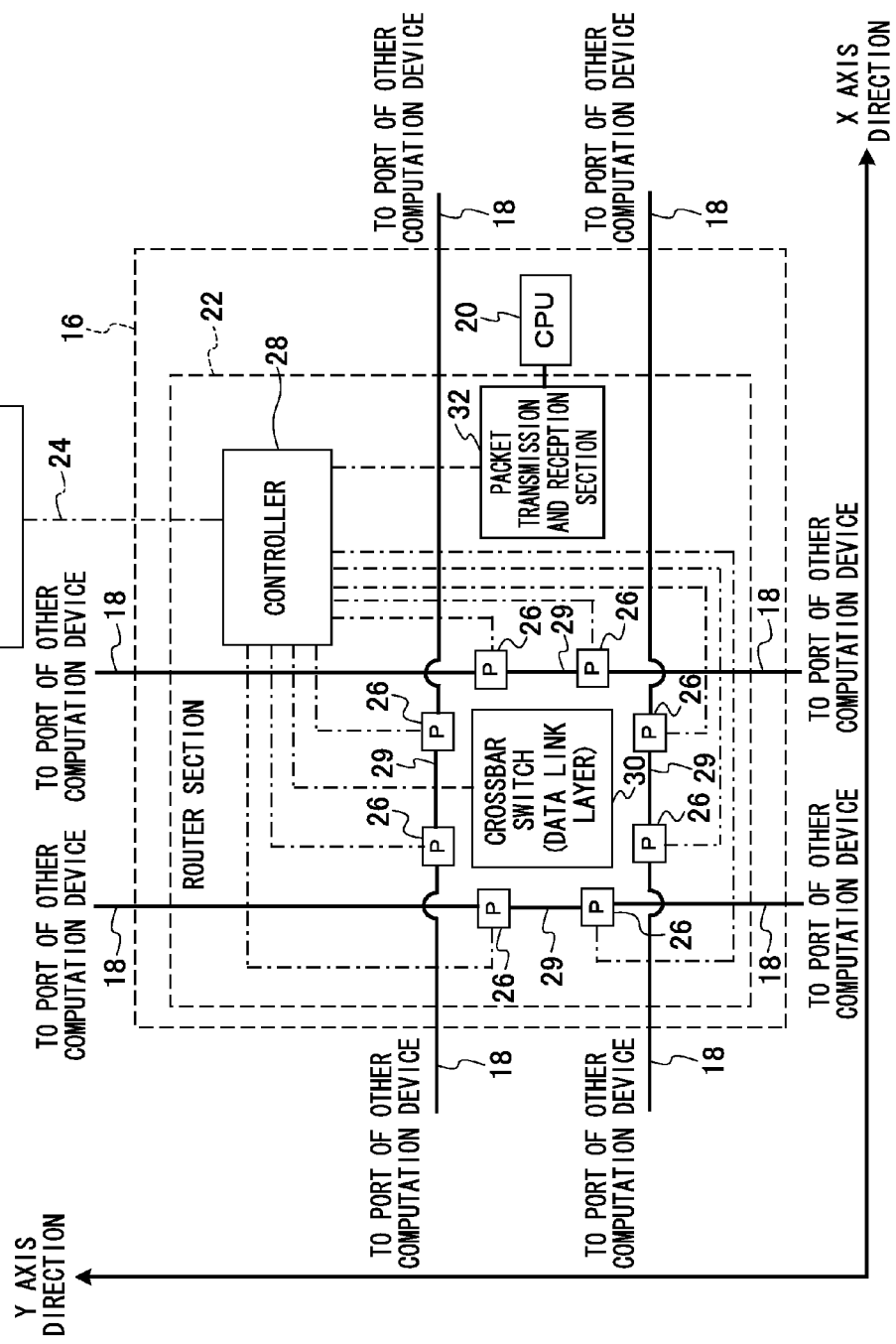
FIG. 10 is a schematic configuration diagram illustrating an example of an embodiment in which ports are connected between at a physical layer level by performing switching control processing according to an exemplary embodiment.

FIG. 10 illustrates an example of an embodiment in which each pair is connected at the physical layer level for all of the pair-configuring ports 26 included in the computation device 16. In the computation devices 16 illustrated in FIG. 10, the terminals 34 are connected together by the bypass line 29 for each pair of all the pair-configuring ports 26. Thus a packet transmitted in from one X axis direction adjacent computation device 16 can be made to pass through and be transmitted on out to another X axis direction adjacent computation device 16. Moreover, a packet transmitted in from one Y axis direction adjacent computation device 16 can also be made to pass through and be transmitted on out to another Y axis direction adjacent computation device 16.

Figure 11:
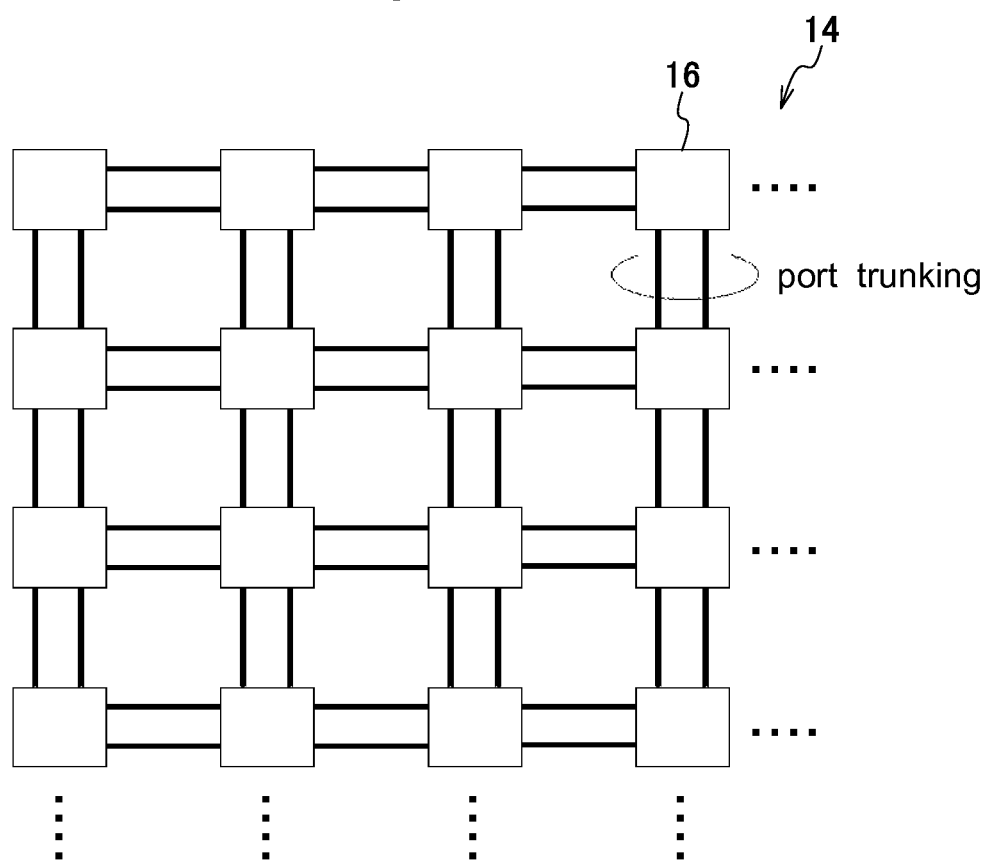
FIG. 11 is a schematic configuration diagram illustrating an example of an embodiment in which ports are connected between at an upper layer level (data link layer level) by performing switching control processing according to an exemplary embodiment.

As an example of a symmetrical connection pattern illustrated in FIG. 10, FIG. 11 illustrates an example in which port trunking is employed (for example a method to raise connection speed between respective hubs by using plural ports 26 to connect the respective hubs together). In such a case all of the pair-configuring ports 26 are connected to the crossbar switch 30. A mesh network is thereby configured in the data processing apparatus 14 as a whole, and the communication band is widened in comparison to a case in which any of the pairs of ports 26 are connected together at the physical layer level. Namely, due to employing port trunking, for an application layer a band link that appears wider than for example when pairs of ports 26 are connected at the physical layer level can be achieved, even though there is no change to the number of links (the communication lines 18).

Figure 12:
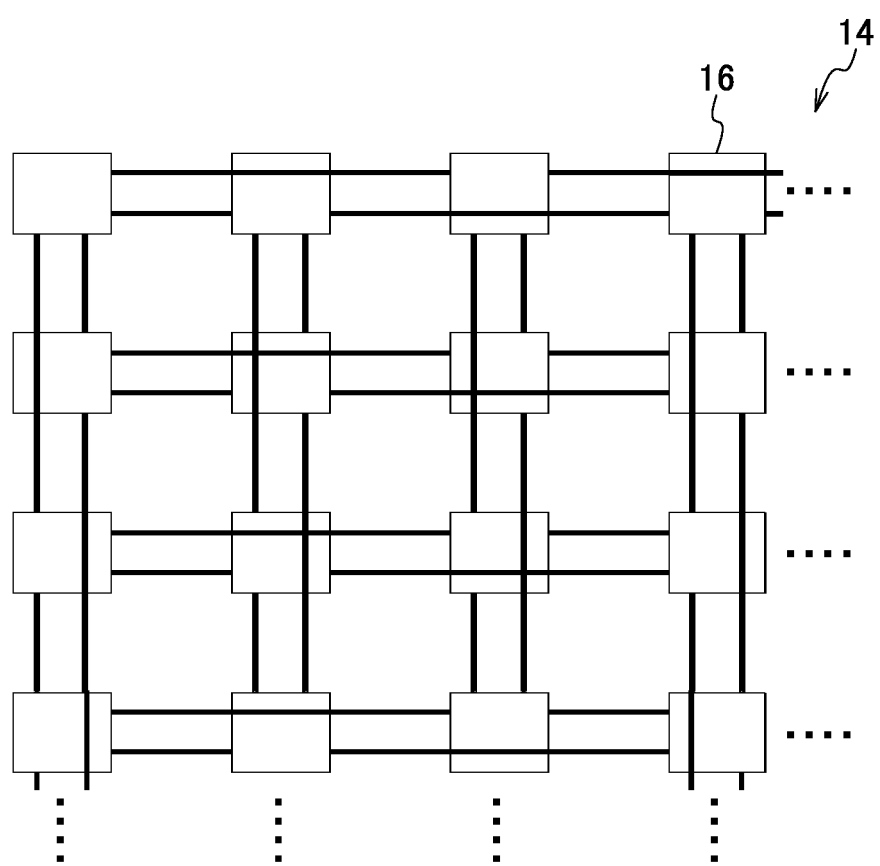
FIG. 12 is a schematic configuration diagram illustrating an example of an embodiment in a case in which a torus network is formed in a parallel computation section according to an exemplary embodiment.
Figure 13:
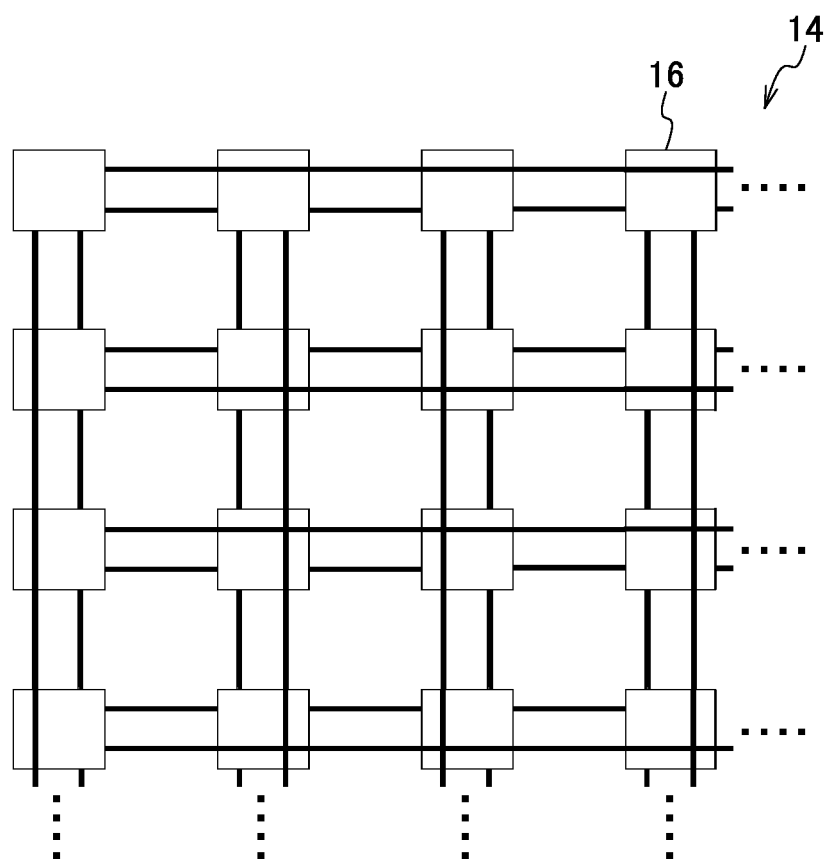
FIG. 13 is a schematic configuration diagram illustrating an example of an embodiment in a case in which a hypercube network is formed in a parallel computation section according to an exemplary embodiment.

In the example illustrated in FIG. 10, in a single device of the computation devices 16 each pair of all of the pair-configuring ports 26 are connected at the physical layer level, however configuration may be made in which only some pairs of the pair-configuring ports 26 are connected at the physical layer level. Examples of such configurations are illustrated in FIG. 12 and FIG. 13. The example illustrated in FIG. 12 illustrates topology in which connection between the ports 26 in each of the computation devices 16 at the physical layer level is performed differently for each of the communication lines 18. Namely, the X axis direction computation devices 16 and the Y axis direction computation devices 16 are respectively ring-connected, and a torus network is thereby formed in the data processing apparatus 14 as a whole.

In the example illustrated in FIG. 13, for single units of 4 lines of the communication lines 18 parallel to the X axis direction, the computation devices 16 connect between the ports 26 at the physical layer level for every other line out of the 4 lines of the communication lines 18 for each unit. Moreover, for single units of 4 lines of the communication lines 18 parallel to the Y axis direction, the computation devices 16 connect between the ports 26 at the physical layer level for every other line out of the 4 lines of the communication lines 18 for each unit. A hypercube network is accordingly formed in the data processing apparatus 14 as a whole.

Figure 14:
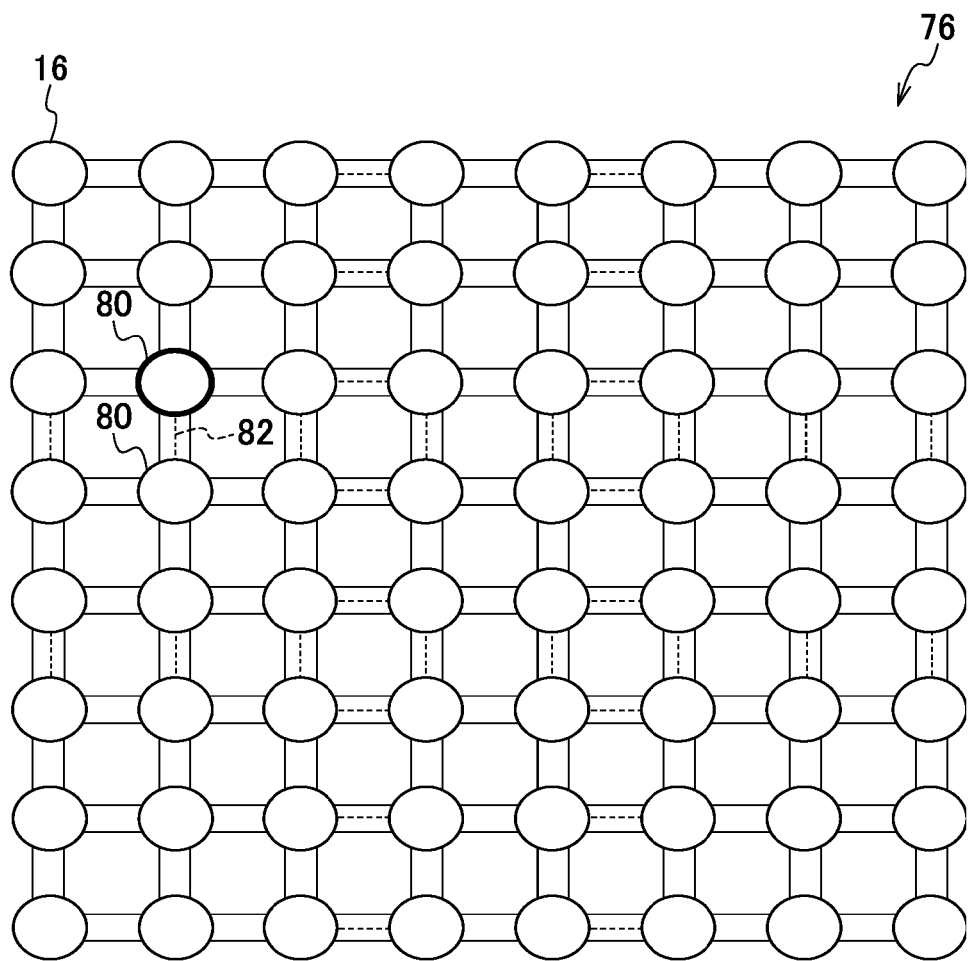
FIG. 14 is a schematic configuration diagram illustrating a modified example of a parallel computation section according to an exemplary embodiment.
Figure 15:
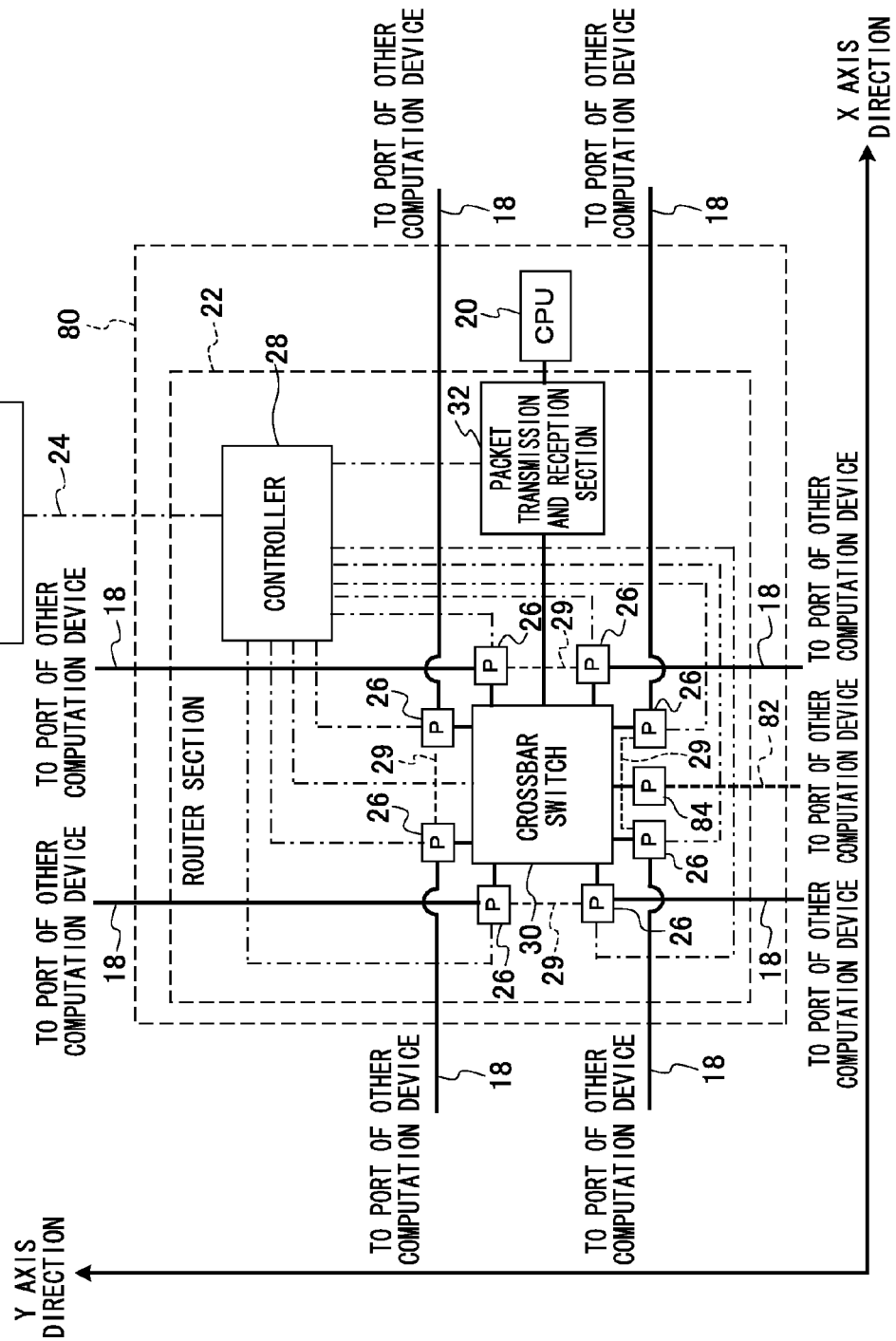
FIG. 15 is a schematic configuration diagram illustrating an example of relevant portions of a configuration of a computation device included in the parallel computation section illustrated in FIG. 14.

FIG. 14 illustrates an example of a data processing apparatus 76 that is a modified example of the data processing apparatus 14. The data processing apparatus 76 differs from the data processing apparatus 14 in that plural adjacent sets of pair-configuring computation devices 80 each provided with increased ports are employed in the data processing apparatus 14 in place of some of the plural sets of adjacent pair-configuring computation devices 16. As illustrated in FIG. 14, the computation devices 80 are respectively connected by communication lines 82 to adjacent pair configuring computation devices 80. An example of the configuration of the computation device 80 illustrated by a bold line in FIG. 14 is illustrated in FIG. 15. As illustrated in FIG. 15, the computation device 80 differs from the computation device 16 illustrated in FIG. 2 in that ports 84 are additionally provided. The ports 84 differ from the ports 26 in that the communication lines 82 are applied in place of the communication lines 18, and in that bypass lines 29 are not connected to the ports 84.

In the thus configured data processing apparatus 14, a mesh network is formed by disconnecting between the ports 84 of the pair-configuring computation devices 80. The communication band can accordingly be made uniform in the X axis direction and the Y axis direction. A saving in power consumption can also be achieved by switching off the power reception control switch of the respective logic circuits 38 contained in the ports 84 when the communication lines 82 are not in use. Note that control to disconnect between the ports 84 and to switch off the power reception control switch is realized by setting to "1" a value of the setting register of the respective port control register 40 included in the ports 84.

Figure 16:
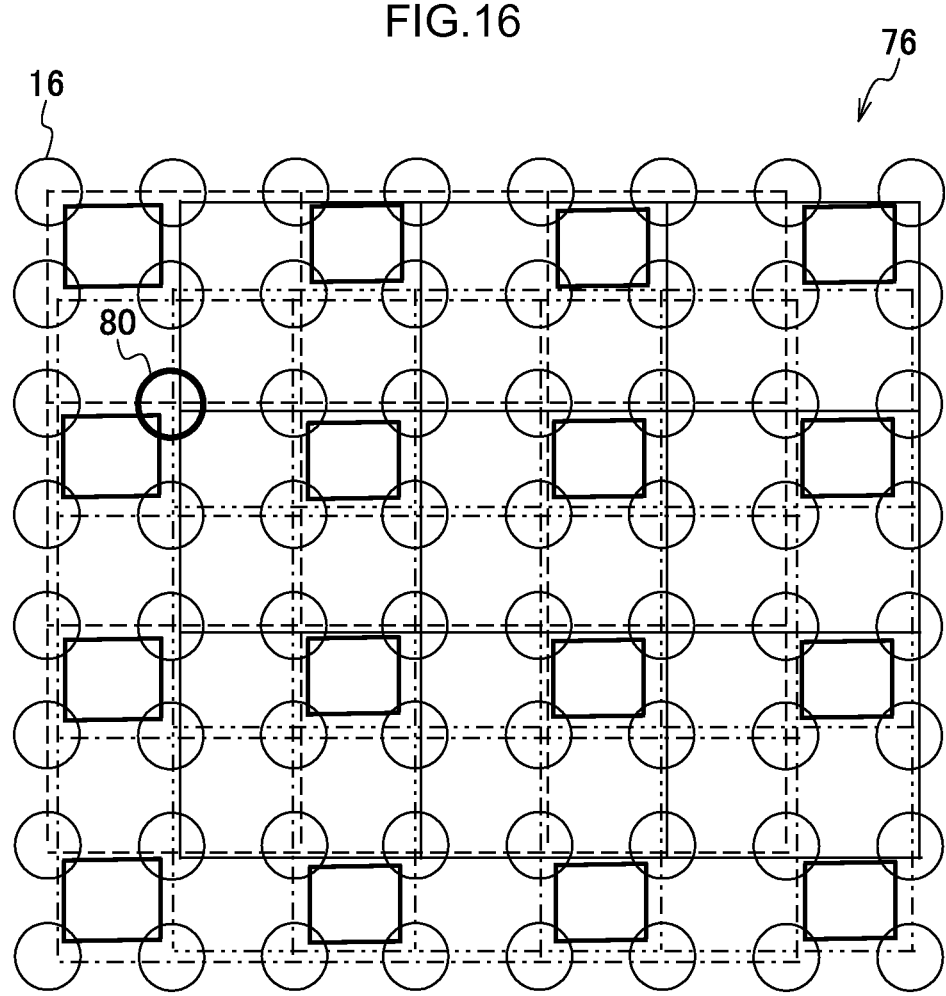
FIG. 16 is a schematic configuration diagram illustrating an example of an embodiment in a case in which a mesh-torus network is formed in the parallel computation section illustrated in FIG. 14.
Figure 17:
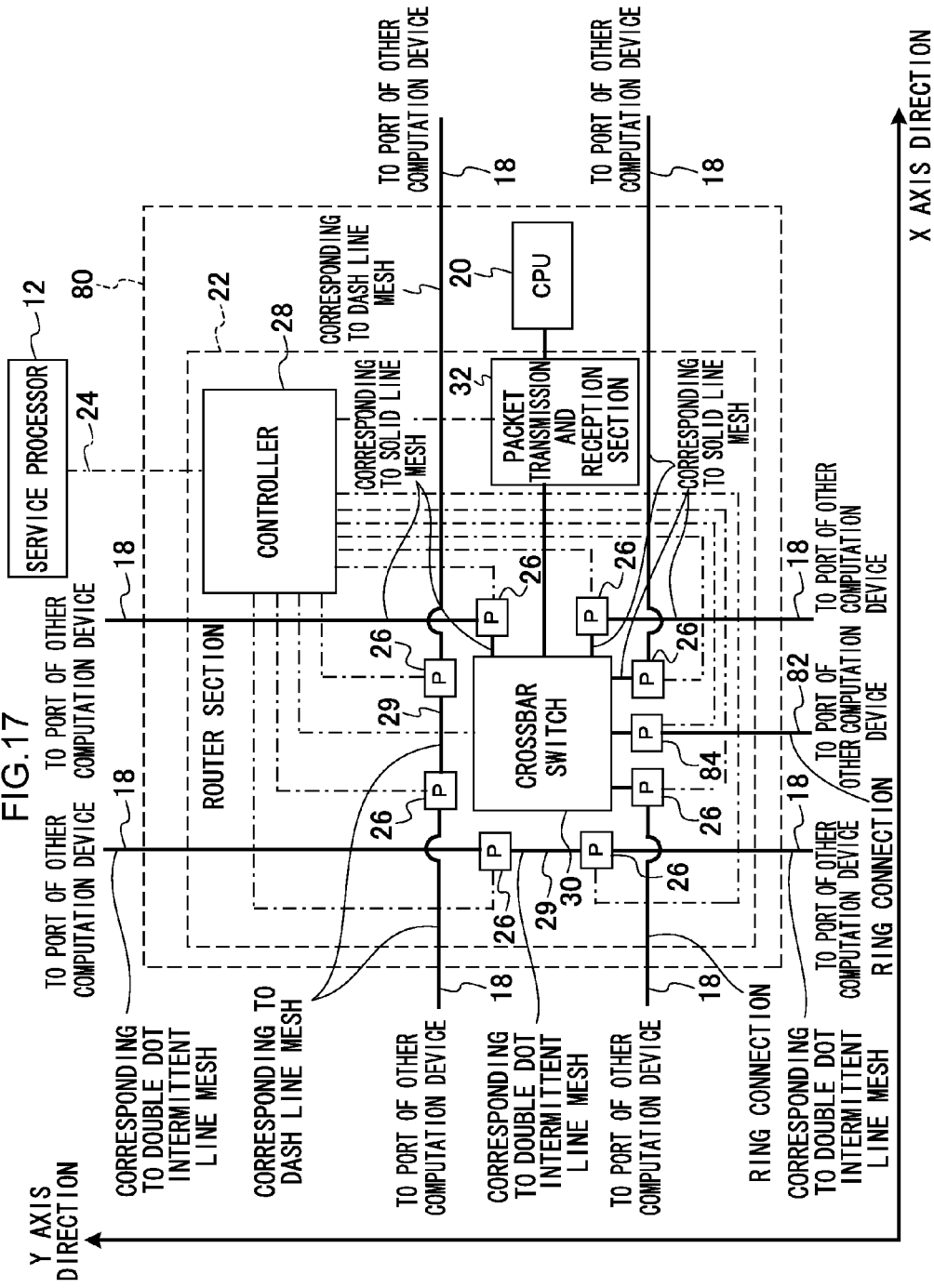
FIG. 17 is a schematic configuration diagram illustrating an example of relevant portions of a configuration of a computation device included in the parallel computation section formed with a mesh-torus network illustrated in FIG. 16.

FIG. 16 illustrates an example of a case in which a mesh-torus network is formed in the data processing apparatus 76 illustrated in FIG. 14. Reference here to a mesh-torus network means that, for example, a network of a mesh and a network of a torus co-exist depending on the axial direction such as the X axis or the Y axis. 4×4 mesh networks are illustrated respectively in FIG. 16 by a dash line mesh, a single dot intermittent line mesh, a solid line mesh and a double dot intermittent line mesh, with the apex points of each of the mesh networks ring-connected. In the example illustrated in FIG. 16, the apex points of the solid line square shapes are also at least at one apex point of a dash line mesh, a solid line mesh or a double dot intermittent line mesh. An example of a configuration of the computation device 80 illustrated by the solid lines in FIG. 16 is illustrated in FIG. 17. As illustrated in FIG. 17, in the computation device 80 the ports 26 corresponding to the communication lines 18 and the bypass lines 29, corresponding to the dash line mesh and the double dot intermittent line mesh illustrated in FIG. 16, are connected together at the physical layer level. The ports 26 corresponding to the other communication lines 18, 82 are connected together at the upper layer level.

By thus switching between a situation of connection between the ports 26 at the physical layer level and a situation of being connected between at the upper layer level, a three dimensional topology can be employed to connect between two dimensional arrayed nodes (between computation devices 16, between computation devices 80, and between computation devices 16 and 80). Switching can accordingly be made between a two dimensional communication network (for example the mesh network illustrated in FIG. 16) and a three dimensional communication network (for example the mesh-torus network illustrated in FIG. 16). By thereby utilizing the technology illustrated in FIG. 16 when simulating in a physical field that handles space in three or more dimensions, or when performing three dimensional modeling in a chemical field, such as the physical properties of crystals or organic chemicals, problems are readily mapped by employing the above three dimensional communication network. Connecting at the physical layer level for problems such as those in which a large amount of communication is performed simultaneously in parallel between each adjacent node that has been mapped in three dimensions such as in lattice QCD, enables situations to be avoided in which there is common linking between the individual respective nodes and interference occurs. A drop in communication efficiency and uneven bands between nodes can also be suppressed.

Figure 18:
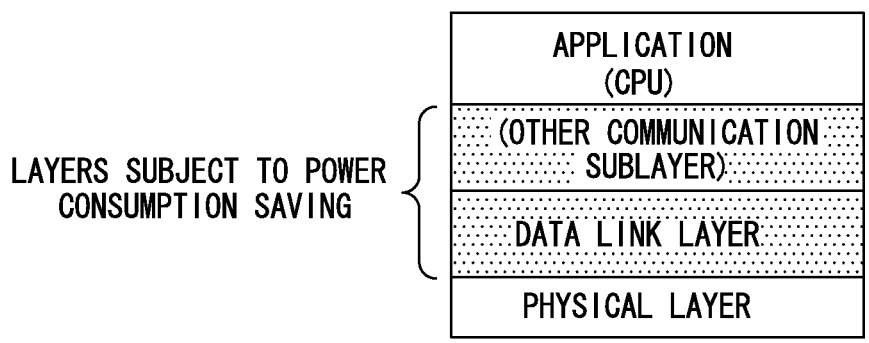
FIG. 18 is a schematic diagram illustrating power consumption saving applied from a data link layer to a layer directly below an application layer.

Note that in the above an example is given of an embodiment in which control is performed by the control section 44 to suppress power consumption of the logic circuits 38 employed for connection of the data link layer when there is a physical layer level connection between the ports 26, however the technology disclosed herein is not limited thereto. For example, control may be performed so as to stop power supply to each section employed in communication from the data link layer to the layer directly below the application layer as illustrated in FIG. 18. Such cases can for example be illustrated by an example of an embodiment in which the control section 44 halts power supply to the controller 28 and the packet transmission and reception section 32. (In FIG. 18 the "other communication sublayer" handles, for example, buffering, packet generation/analysis logic, or memory access section, and the "data link layer" handles communication of for example buffering, packet analysis, error check, or retransmission logic. Power to ports other than bypassed ports is supplied.)

Note that when the physical layer includes plural sublayers in a communication protocol that make the connection at the physical layer level as described above, control may also be performed by the control section 44 to suppress power consumption of each section employed for communication in layers other than the layers making the above connection at the physical layer level.

Figure 19:
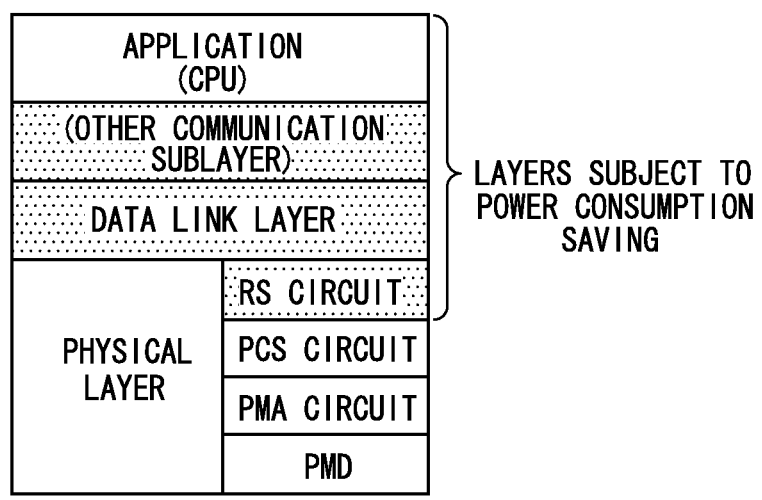
FIG. 19 is a schematic diagram illustrating power consumption saving applied from a data link layer to a layer directly below an application layer, as well as applied to an RS layer included in a physical layer.

FIG. 19 is a schematic diagram illustrating an example in which a physical layer is configured including plural sublayers and between layers connection is performed by a serializer/deserializer (SerDes) (a circuit that converts to-and-fro between serial and parallel in for example a bus of a computer). The physical layer is equipped, from the bottom level to the top level layer, with a Physical Media Dependent (PMD) layer, a PMA circuit serving as an example of a Physical Medium Attachment (PMA) layer, a PCS circuit serving as an example of a Physical Coding Sublayer (PCS) and an RS circuit serving as an example of an RS layer. Data is transferred (transmitted and received) in both directions between the PMA circuit, the PCS circuit and the RS circuit. The PMD layer is a layer defined for example by connections or wavelength/properties of light, with an example being a communication device. The PMA circuit is a circuit that performs conversion of parallel data encoded by the PCS circuit into serial data, or performs conversion the other way round. The PCS circuit is a circuit employed to encode data. The RS circuit is a circuit that is employed to function as a serial communication interface. Note that the PMA circuit, the PCS circuit and the RS circuit are also defined by for example functions in a standard specification such as ETHERNET (registered trademark). When employing the physical layer illustrated in FIG. 19 to connect between the ports 26, the communication device of the PMD layer (referred to below simply as "communication device") is always employed. However, when, as a result of connecting at the physical layer level, clock adjustment needs to be performed due to extended transmission distance, the PMA circuit and the PCS circuit are also employed for detecting gaps between packets in the data link layer. In such cases, since the RS circuit does not need to be employed in the physical layer, the control section 44 may be configured to control to halt power supply to the RS circuit without halting power supply to the communication device, the PMA circuit and the PCS circuit. (The ability to switch off the PMA circuit and the PCS circuit, or the lack of such ability, depends on the physical layer implementation).

Figure 20:
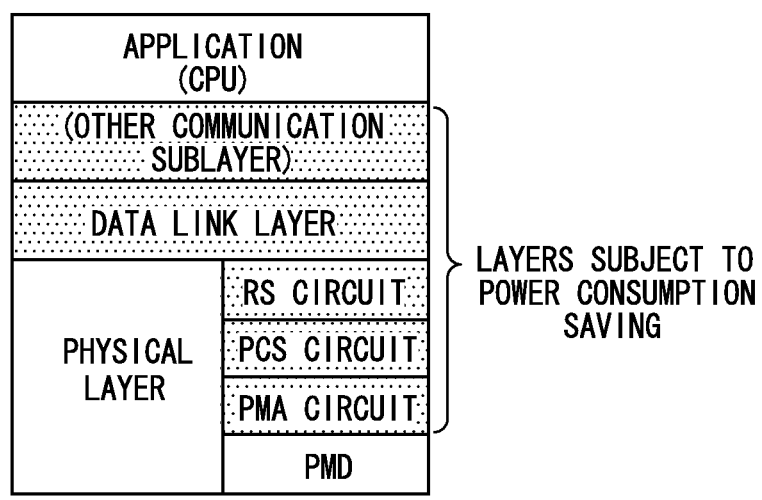
FIG. 20 is a schematic diagram illustrating power consumption saving applied from a data link layer to a layer directly below an application layer, as well as applied from a PMA layer to an RS layer included in a physical layer subject to power consumption saving.
Figure 22:
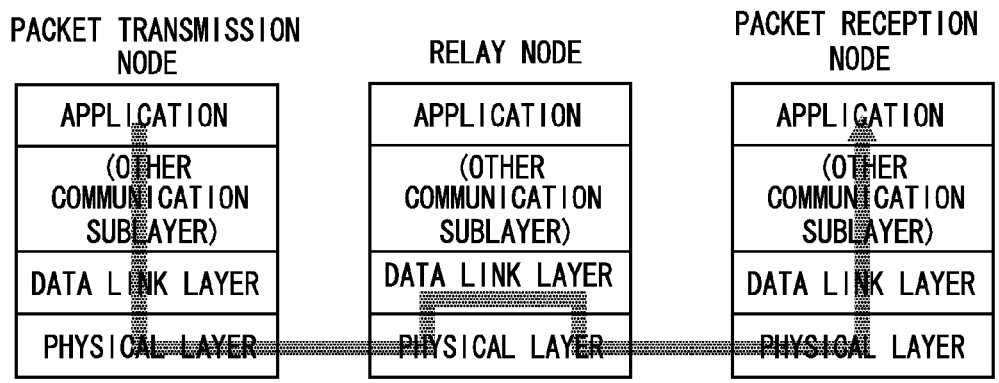
FIG. 22 is a schematic diagram illustrating an example of a node that transmits packets (packet transmission node), a node that receives packets (packet reception node), and a node that relays packets (relay node).

In contrast, the PMA circuit, the PCS circuit and the RS circuit are not essential when the SerDes margin is sufficiently large and clock adjustment is unnecessary. In such cases, the control section 44 may control such that power supply is halted to the PMA circuit, the PCS circuit and the RS circuit while not halting power supply to the communication device, such as illustrated as an example in FIG. 20.

The transmission speed is raised when the PMA circuit, the PCS circuit and the RS circuit are not employed, namely when connection between the ports 26 is performed with only the communication device, in comparison to when connection between the ports 26 is performed using all of the communication device, the PMA circuit, the PCS circuit and the RS circuit. For example, when 8b10b is employed as the data transmission method (a transmission method in which 8 bits out of 10 bits are employed for the main data and the remaining 2 bits are employed as bits to define the read-in timing) then processing needs to be performed in 10 bit units. Therefore, when connection between the ports 26 is performed using all of the communication device, the PMA circuit, the PCS circuit and the RS circuit, the 1 bit that has been first received is incapable of being transmitted onwards until all of the 10 bits have been received, resulting in a delay in the transmission speeds. Such a delay is even greater when a 64b66b is employed (a transmission method in which 64 bits out of 66 bits are employed for the main data and the remaining 2 bits are employed as bits for defining the read-in timing). However, delay can be greatly suppressed when the PMA circuit, the PCS circuit and the RS circuit are not employed, since data simply passes through.

In the above an example has been given in which power consumption is suppressed by switching off power to the logic circuit 38, however the technology disclosed herein is not limited thereto. For example, a low power mode (such as a sleep mode) may be actuated.

Moreover, the data processing system 10 corresponding to the data processing system is illustrated as an example in Table 1 below, however the technology disclosed herein is not limited thereto. For example, application is also possible to a computation processing device (CPU chip) as illustrated in Table 1. Namely, whereas in a data processing system (the data processing apparatus 14) connection is made between computation processing nodes (the computation devices 16) as illustrated in Table 1, in the computation processing device illustrated in Table 1 connection is made between computation processing sections (cores) containing cache memory. Moreover, whereas in a data processing system connection is between CPU chips by board wiring lines or inter-board cables, in a computation processing device connection is by wiring line inside a CPU chip.

TABLE 1

| Overall | Computation Processing Device (CPU Chip) | Data Processing System |
| --- | --- | --- |
| Computation device | Computation processing section (core) | Computation processing node (CPU chip + router) |
| Connection | CPU chip internal wiring | Board wiring line between CPU chips or inter-board cables |

Moreover, for ease of explanation an example has been given above of a case in which the detection section 46 detects for a defect in the crossbar switch 30 or the logic circuit 38, or in both, however the technology disclosed herein is not limited thereto. For example, detection may be made for defects at any location contained in the computation device 16, such as in the CPU 20 or the packet transmission and reception section 32. When the CPU 20 or the packet transmission and reception section 32, or both, are defective, for example, on receipt of defect notification the service processor 12 isolates this computation device 16 from the other computation devices 16 by connecting all of the ports 26 of this computation device 16 at the physical layer level. Note that similar applies to a core in a computation processing device.

Moreover, although an example has been given above of an embodiment in which the computation load designation value is set (updated) by the service processor 12 (and in which job management is also performed by the service processor 12), the technology disclosed herein is not limited thereto. For example, configuration may be made such that job management software operating on another data processing apparatus separate to the service processor 12 (for example a server device) assigns jobs (computation load assignment; setting the computation load designation value in the above example). In such cases, the service processor 12 that performs control to change the "look" of the system hardware (acquires topology setting data and defect notifications from the computation devices 16, controls to connect between the ports 26 at the physical layer level, and manages power to the ports 26) falls within the category of firmware. In contrast, job management software is software that optimizes job assignment according to a system view provided by firmware (the "look" of the system hardware) and falls within the category of middleware above firmware. Hence a data processing apparatus operating according to job management software either refers to the computation load assignment DB 58, or interrogates the service processor 12 and extracts data of the computation load assignment DB 58. A user application (job) operates above middleware. In such cases, the computation load designation values are managed by job management software. For example, when there are plural cores present within a CPU chip, since it is possible to execute plural jobs in parallel, an ID (job ID) is assigned to a job as illustrated in Table 1, and this job ID is stored in a memory as the computation load designation value. Adopting such an approach enables management of whether or not a node is being used, and when in use enables management of which job is being executed. Note that since there is a high possibility of communication being performed between respective cores handling the same job, job management software manages such that nodes with the same job ID are positioned physically near to each other. Note that as illustrated in Table 2 below, when job management software manages the computation load designation value, it is desirable for the service processor 12 to manage the defect identification value and data identifying the physical layer bypass state/the data link layer power source setting state. Here, "data identifying the physical layer bypass state/the data link layer power source setting state" is data identifying respectively whether any of the ports 26 are connected between at the physical layer, and whether any of the ports 26 are connected between through the data link layer, and can be expressed employing for example port IDs.

TABLE 2

| | Non-Use Node (Including Defective Node) | Use Node |
|---|---|---|
| Computation Load Designation value | "0" | Job ID ("0" is not employed for a job ID) |

The technology disclosed herein has the advantageous effect of being able to achieve a shortened communication time for relay communication by one or more computation device in a data processing apparatus.

The technology disclosed herein has the advantageous effect of being able to achieve a shortened communication time for relay communication by one or more core in a computation device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. A data processing apparatus, comprising:
a plurality of computation devices connected to each other by a communication path; and
a control device that controls the plurality of computation devices,
wherein each of the computation devices includes:
a plurality of terminals respectively connected to the communication path;
a communication section that performs communication in a communication protocol of an upper layer than a physical layer through an internal path connectable to a terminal among the plurality of terminals;
a bypass section connectable between a pair of the plurality of the terminals;
a switching section provided to each of the terminals and switchable between an upper layer use state in which communication between the terminal among the plurality of the terminals and the internal path is performed by the communication section and connection is by other than the bypass section, and an upper layer non-use state in which communication between the terminal and the internal path is performed other than by the communication section and connection is performed by the bypass section; and
a control section controls to switch the switching section to one of the upper layer use state and the upper layer non-use state based on control data input from the control device, and
the control device outputs the control data to a respective control section of the computation devices,
wherein the computation devices include a detection section that detects for a defect at a location within the computation devices, respectively; and
the control device controls a control section of a computation device among the plurality of computation devices, detected by the detection section to be defective such that the switching section corresponding to a terminal related to a location where the defect is detected is switched to the upper layer non-use state,
the communication section includes a plurality of interface sections that correspond to the terminals and that are employed to transfer data to and from a corresponding terminal via a corresponding internal path;
the detection section detects for a corresponding defect in the plurality of interface sections of the terminals; and
the control device controls the control section of the computation device detected by the detection section such that the switching section corresponding to the terminal related to an interface section where the defect has been detected is switched to the upper layer non-use state.

2. The data processing apparatus of claim 1, wherein:
the control data contains first identification data that identifies at least one of a pair of the terminals to be connected at the upper layer non-use state and second identification data that identifies at least one pair of the terminals to be connected at the upper layer use state, or any combination thereof; and
the control section controls such that the pair(s) of switching sections corresponding to the respective pair(s) of terminals identified according to the first identification data are switched to the upper layer non-use state when the first identification data is contained in the control data that has been input, and controls such that the pair(s) of switching sections corresponding to the respective pair(s) of terminals identified according to the second identification data are switched to the upper layer use state when the second identification data is contained in the control data that has been input.

3. The data processing apparatus of claim 1, wherein:
the control section controls so as to suppress power consumption of the respective interface section(s) corresponding to the pair(s) of terminals to be connected at the upper layer non-use state when connection is made between the pair(s) of terminals at the upper layer non-use state.

4. The data processing apparatus of claim 1, wherein the control section further controls so as to suppress power consumption of the interface section detected by the detection section to be defective.

5. The data processing apparatus of claim 1, wherein:
the physical layer in a computation device includes a plurality of sublayers in a communication protocol including a layer that makes a connection between the pair of terminals at the upper layer non-use state; and
the control section controls when connection is made between the pair of terminals at the upper layer non-use state so as to suppress power consumption of each section employed for communication in layer(s) other than the layer that makes the connection.

6. The data processing apparatus of claim 1, wherein
the computation device relays data transferred to and from another of the computation devices through the pair of terminals connected in the upper layer non-use state by the control section controlling such that respective pair(s) of the switching sections corresponding to the pair(s) of the terminals identified by the first identification data are switched to the upper layer non-use state when the first identification data is contained in the control data that has been input.

7. A computation device connected to a control device, comprising:
a plurality of terminals respectively connected to a communication path;
a communication section that performs communication in a communication protocol of an upper layer than a physical layer through an internal path connectable to a terminal among the plurality of terminals;
a bypass section connectable between a pair of the plurality of the terminals;
a switching section provided to each of the terminals and switchable between an upper layer use state in which communication between the terminal of the plurality of the terminals and the internal path is performed by the communication section and connection is by other than the bypass section, and an upper layer non-use state in which communication between the terminal and the internal path is performed other than by the communication section and connection is performed by the bypass section;
a control section that controls to switch the switching section provided to one of the upper layer use state and the upper layer non-use state based on control data input from the control device; and
a detection section that detects for a defect at a location within the computation device,
wherein the control section controls such that the switching section corresponding to the terminal related to the location where the defect is detected by the detection section is switched to the upper layer non-use state,
wherein the communication section includes a plurality of interface sections that correspond to the terminals and are each employed to transfer data to and from a corresponding terminal via a corresponding internal path;
the detection section detects for a corresponding defect in the plurality of interface sections of the terminals; and
the control section controls such that the switching section corresponding to the terminal related to an interface section where a defect has been detected by the detection section is switched to the upper layer non-use state.

8. The computation device of claim 7, wherein:
the control section controls when connection is made between pair(s) of the terminals at the upper layer non-use state to suppress power consumption of the respective interface sections of pair(s) of the terminals to be connected at the upper layer non-use state.

9. The computation device of claim 7, wherein:
the physical layer in the computation device includes a plurality of sublayers in a communication protocol including a layer that makes a connection between the pair of terminals at the upper layer non-use state; and
the control section controls when connection is made between the pair of terminals at the upper layer non-use state so as to suppress power consumption of each section employed for communication in layer(s) other than the layer that makes the connection.

10. A method to control a data processing apparatus that includes a plurality of computation devices connected to each other by a communication path and a control device that controls the plurality of computation devices, the method comprising:
outputting, by the control device, control data to each of the computation devices; and
switching, by the computation devices, a terminal corresponding to the computation devices based on the control data, the switching being between
an upper layer use state employing a communication section that performs communication with a communication protocol of an upper layer than a physical layer through an internal path connectable to a terminal among the plurality of terminals respectively connected to the communication path, in which in the upper layer use state communication is performed between the terminal of the plurality of the terminals and the internal path and connection is by other than a bypass section that is connectable between a pair of the plurality of the terminals, and
an upper layer non-use state in which communication between the terminal and the internal path is performed other than by the communication section and connection is performed by the bypass section,
detecting, by a computation device, a defect at a location within the computation device; and wherein the control device switches the upper layer use state of the pair of terminals to the upper layer non-use state when a terminal, related to a location detected as being defective, among the plurality of computation devices is in the upper layer use state, the computation device detects for a defect in a plurality of interface sections that correspond to the terminals and that transfer data to and from a corresponding terminal via a corresponding internal path; and the computation device switches the upper layer use state of the pair of terminals to the upper layer non-use state, when the terminal related to an interface section where a defect is detected is in the upper layer use state.

11. The control method of claim 10, wherein:

the control data contains first identification data that identifies at least one pair of the terminals to be connected in the upper layer non-use state, or second identification data that identifies at least one pair of the terminals to be connected at the upper layer use state level, or any combination thereof; and in the computation device, in a state in which the input control data contains the first identification data, when pair(s) of terminals identified according to the first identification data are in the upper layer use state, the upper layer use state of the pair(s) of terminals is switched to the upper layer non-use state.

12. The control method of claim 10, wherein when connection is made between the pair(s) of terminals at the upper layer non-use state the computation device suppresses power consumption of interface sections corresponding to respective pair(s) of the terminals to be connected at the upper layer non-use state among a plurality of interface sections that are provided respectively corresponding to each of the terminals and that are employed to transfer data to and from each of the corresponding terminals via the corresponding internal path.

13. The control method of claim 10, wherein:

the physical layer in the computation device includes a plurality of sublayers in a communication protocol including a layer that makes a connection between the pair of terminals at the upper layer non-use state; and when connection is made between the pair of terminals at the upper layer non-use state the computation device suppresses power consumption of each section employed for communication in layer(s) other than the layer that makes the connection.

14. The control method of claim 10, wherein when the first identification data is contained in the control data that has been input, the computation device relays data transferred to and from another of the computation devices through the pair of terminals connected in the upper layer non-use state by switching respective pair(s) of the terminals identified by the first identification data to the upper layer non-use state.

* * * * *